US012394385B2

(12) United States Patent
Seo et al.

(10) Patent No.: US 12,394,385 B2
(45) Date of Patent: Aug. 19, 2025

(54) SCAN DRIVER AND DISPLAY DEVICE INCLUDING THE SAME

(71) Applicant: Samsung Display Co., LTD., Yongin-si (KR)

(72) Inventors: Young Wan Seo, Yongin-si (KR); Hae Min Kim, Yongin-si (KR); Geun Ho Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/782,723

(22) Filed: Jul. 24, 2024

(65) Prior Publication Data

US 2025/0209989 A1 Jun. 26, 2025

(30) Foreign Application Priority Data

Dec. 21, 2023 (KR) ........................ 10-2023-0188698

(51) Int. Cl.

| | |
|---|---|
| ***G06F 3/044*** | (2006.01) |
| ***C23F 1/02*** | (2006.01) |
| ***C23F 1/14*** | (2006.01) |
| ***G01R 27/26*** | (2006.01) |
| ***G06F 3/041*** | (2006.01) |
| ***G06F 3/045*** | (2006.01) |
| ***G09G 3/32*** | (2016.01) |

(Continued)

(52) U.S. Cl.

CPC ............. *G09G 3/3266* (2013.01); *G09G 3/32* (2013.01); *G09G 3/3291* (2013.01); *G09G 2310/0267* (2013.01); *G09G 2310/0275* (2013.01)

(58) Field of Classification Search

CPC ...... G09G 3/3266; G09G 3/32; G09G 3/3291; G09G 2310/0267; G09G 2310/0275

See application file for complete search history.

(56) References Cited

U.S. PATENT DOCUMENTS

| | | | |
|---|---|---|---|
| 10,074,326 | B2 | 9/2018 | Otose |
| 10,497,334 | B2 | 12/2019 | So et al. |
| 11,404,006 | B2 | 8/2022 | Xue |

(Continued)

FOREIGN PATENT DOCUMENTS

| | | |
|---|---|---|
| JP | 2016-161824 | 9/2016 |
| KR | 10-2018-0014277 | 2/2018 |

(Continued)

*Primary Examiner* — Andrew Sasinowski

(74) *Attorney, Agent, or Firm* — KILE PARK REED & HOUTTEMAN PLLC

(57) ABSTRACT

A scan driver includes stages which sequentially output scan signals to scan signal lines during an active period of an N-th frame, and at least one of the stages includes an output node controller that supplies a gate-on voltage to a pull-up node in response to a gate control signal of a display driver; and an output controller that outputs a scan signal to a scan signal line by outputting a scan clock signal to a scan signal line in case that the gate-on voltage is supplied to the pull-up node, wherein the output node controller includes a thin-film transistor including a first active layer, and directly or indirectly connected to the pull-up node, and another thin-film transistor including a second active layer including an oxide semiconductor material different from a oxide semiconductor material of the first active layer, and directly connected to the pull-up node.

20 Claims, 15 Drawing Sheets

(51) Int. Cl.

| | |
|---|---|
| ***G09G 3/3266*** | (2016.01) |
| ***G09G 3/3291*** | (2016.01) |

(56) References Cited

U.S. PATENT DOCUMENTS

| | | | | |
|---|---|---|---|---|
| 2022/0284849 | A1* | 9/2022 | Shin | G11C 19/28 |
| 2023/0351972 | A1* | 11/2023 | In | G09G 3/3266 |
| 2024/0304727 | A1 | 9/2024 | Kim et al. | |
| 2024/0321212 | A1* | 9/2024 | Kim | G09G 3/3233 |

FOREIGN PATENT DOCUMENTS

| | | |
|---|---|---|
| KR | 10-2040650 | 12/2019 |
| KR | 10-2023-0068104 | 5/2023 |
| KR | 10-2023-0090382 | 6/2023 |
| KR | 10-2024-0072413 | 5/2024 |
| KR | 10-2024-0095556 | 6/2024 |
| KR | 10-2024-0139140 | 9/2024 |

* cited by examiner

SCAN DRIVER AND DISPLAY DEVICE INCLUDING THE SAME

CROSS-REFERENCE TO RELATED APPLICATION(S)

This application claims priority to and benefits of Korean Patent Application No. 10-2023-0188698 under 35 U.S.C. § 119, filed on Dec. 21, 2023 in the Korean Intellectual Property Office, the entire contents of which are incorporated herein by reference.

BACKGROUND

1. Technical Field

Embodiments relate to a scan driver and a display device including the scan driver.

2. Description of the Related Art

As the information society develops, demands for display devices for displaying images are increasing in various forms. For example, display devices are applied to various electronic devices such as smartphones, digital cameras, notebook computers, navigation devices, and smart televisions.

The display devices may be flat panel display devices such as liquid crystal display devices, quantum dot display devices, and organic light emitting display devices.

A display device includes a display panel which includes data lines, scan signal lines and pixels connected to the data lines and the scan signal lines, a scan driver which supplies scan signals to the scan signal lines, and a data driver which supplies data voltages to the data lines.

The scan driver may be formed in a non-display area of the display panel. The scan driver formed in the display panel includes thin-film transistors which are turned on and off in response to gate control signals. Since the thin-film transistors of the scan driver are kept turned on or off for a certain period of time, the operating characteristics, such as operating conditions, of the thin-film transistors should be kept constant.

SUMMARY

Embodiments provide a scan driver capable of improving the material of a semiconductor layer to reduce electrical stress of thin-film transistors by which is subjected to stress due to current amount or voltage bootstrapping, and a display device including the scan driver.

Embodiments also provide a scan driver capable of raising or adjusting electrical characteristics by improving the material of a semiconductor layer of at least one thin-film transistor directly connected to a pull-up node of each scan signal output stage, and a display device including the scan driver.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment, a scan driver may include stages which sequentially output scan signals to scan signal lines during an active period of an N-th frame, wherein N is a positive integer, and at least one of the stages may include an output node controller that supplies a gate-on voltage to a pull-up node in response to a gate control signal of a display driver; and an output controller that supplies a scan signal to a scan signal line by outputting a scan clock signal, which is input through a scan clock terminal, to the scan signal line in case that the gate-on voltage is supplied to the pull-up node, wherein the output node controller may include at least one thin-film transistor which includes a first active layer including a first oxide semiconductor material, and is directly or indirectly connected to the pull-up node, and at least another one thin-film transistor which includes a second active layer including a second oxide semiconductor material different from the first oxide semiconductor material of the first active layer, and is directly connected to the pull-up node.

The output node controller may include: a first transistor which is turned on in case that the pull-up node is enabled by the gate-on voltage and supplies the scan clock signal to a first capacitor, which is connected to the first transistor in parallel; a second transistor which is turned on in case that a pull-down node is enabled by the gate-on voltage and supplies a gate-off voltage to the first transistor; a third transistor which is turned on in case that the pull-up node is enabled by the gate-on voltage and supplies another scan clock signal to the pull-down node; a fourth transistor which is turned on in response to a line selection signal of a sensing signal terminal or a previous carry signal and supplies the gate-on voltage to the pull-up node; a fifth transistor which is turned on in response to the another scan clock signal and supplies the gate-on voltage to the pull-down node; a sixth transistor which electrically connects the pull-up node to another transistor or the first capacitor in response to the scan clock signal; and a seventh transistor which is turned on in case that the pull-down node is enabled and electrically connects the sixth transistor to the first capacitor and the first transistor.

The output controller may include: a pull-up transistor which is turned on by the gate-on voltage of the pull-up node and outputs the scan clock signal to a scan output terminal and the scan signal line; and a pull-down transistor which is turned on by the gate-on voltage of the pull-down node and outputs the gate-off voltage to the scan output terminal and the scan signal line.

The pull-down transistor may include the first active layer including the first oxide semiconductor material, and the pull-down transistor may include the second active layer including the second oxide semiconductor material different from the first oxide semiconductor material.

The output node controller may further include an eighth transistor which disables the pull-up node using the gate-off voltage or the scan clock signal in response to a next carry signal from a next stage.

At least one of the second, fifth, sixth, and seventh transistors indirectly connected to the pull-up node among the first through eighth transistors included in the output node controller may include the first active layer including the first oxide semiconductor material, and at least one of the first, third, fourth, and eighth transistors directly connected to the pull-up node among the first through eighth transistors included in the output node controller may include the second active layer including the second oxide semiconductor material different from the first oxide semiconductor material of the first active layer.

The first transistor may have a gate electrode connected to the pull-up node, a first electrode connected to a second scan clock terminal and a second electrode connected to a previous carry terminal and a first electrode of the second transistor, the second transistor may have a gate electrode connected to the pull-down node, the first electrode connected to the second electrode of the first transistor and the previous carry terminal and a second electrode connected to a gate-off voltage supply terminal, the third transistor may have a gate electrode connected to the pull-up node, a first electrode connected to a first scan clock terminal and a second electrode connected to the pull-down node, the fourth transistor may have a gate electrode connected to the sensing signal terminal or the previous carry terminal, a first electrode connected to a gate-on voltage supply terminal and a second electrode connected to the pull-up node, the fifth transistor may have a gate electrode connected to the first scan clock terminal, the first electrode connected to the gate-on voltage supply terminal and a second electrode connected to the pull-down node, the sixth transistor may have a gate electrode connected to the second scan clock terminal, a first electrode connected to the pull-up node and a second electrode connected to the second electrode of the first transistor or a first electrode of the seventh transistor, and the seventh transistor may have a gate electrode connected to the pull-down node, the first electrode connected to the second electrode of the sixth transistor and a second electrode connected to the second electrode of the first transistor and the first capacitor.

The output controller may include: a pull-up transistor having a first electrode connected to the second scan clock terminal, a gate electrode connected to the pull-up node, and a second electrode connected to a scan output terminal; and a pull-down transistor having a first electrode connected to the scan output terminal, a gate electrode connected to the pull-down node, and a second electrode connected to a gate-off voltage supply terminal.

The pull-down transistor may include the first active layer including the first oxide semiconductor material, and the pull-up transistor may include the second active layer including the second oxide semiconductor material different from the first oxide semiconductor material of the first active layer.

The output node controller may further include an eighth transistor including: a gate electrode connected to a next carry terminal, a first electrode connected to the previous carry terminal or the gate-off voltage supply terminal, and a second electrode connected to the pull-up node.

At least one of the second, fifth, sixth, and seventh transistors indirectly connected to the pull-up node among the first through eighth transistors included in the output node controller may include the first active layer including the first oxide semiconductor material, and at least one of the first, third, fourth, and eighth transistors directly connected to the pull-up node among the first through eighth transistors included in the output node controller may include the second active layer including the second oxide semiconductor material different from the first oxide semiconductor material of the first active layer.

The first active layer may include indium-gallium-zinc-oxide, and the second active layer may include indium-gallium-zinc-tin oxide.

According to an embodiment, a display device may include a plurality of pixels arranged in a display area of a display panel, a touch sensing unit disposed on a front of the display panel and integral with the display panel, a touch driver that senses a touch using a plurality of touch electrodes arranged in the touch sensing unit, a display driver that controls data voltages supplied to the plurality of pixels and image display timing of the plurality of pixels, and a scan driver that sequentially drives scan signal lines, which are connected to the pixels, in response to a gate control signal received from the display driver, wherein the scan driver may include stages which sequentially output scan signals to the scan signal lines during an active period of an N-th frame, wherein N is a positive integer, and at least one of the stages may comprise an output node controller that supplies a gate-on voltage to a pull-up node in response to a gate control signal of a display driver, and an output controller that supplies a scan signal to a scan signal line by outputting a scan clock signal, which is input through a scan clock terminal, to the scan signal line in case that the gate-on voltage is supplied to the pull-up node, wherein the output node controller may include at least one thin-film transistor including a first active layer including a first oxide semiconductor material and is indirectly connected to the pull-up node, and at least another one thin-film transistor including a second active layer including a second oxide semiconductor material different from the first oxide semiconductor material of the first active layer, and is indirectly connected to the pull-up node.

The output node controller may include: a first transistor which is turned on in case that the pull-up node is enabled by the gate-on voltage and supplies the scan clock signal to a first capacitor, which is connected to the first transistor in parallel; a second transistor which is turned on in case that a pull-down node is enabled by the gate-on voltage and supplies a gate-off voltage to the first transistor; a third transistor which is turned on in case that the pull-up node is enabled by the gate-on voltage and supplies another scan clock signal to the pull-down node; a fourth transistor which is turned on in response to a line selection signal of a sensing signal terminal or a previous carry signal and supplies the gate-on voltage to the pull-up node; a fifth transistor which is turned on in response to the another scan clock signal and supplies the gate-on voltage to the pull-down node; a sixth transistor which electrically connects the pull-up node to another transistor or the first capacitor in response to the scan clock signal; and a seventh transistor which is turned in case that the pull-down node is enabled on and electrically connects the sixth transistor to the first capacitor and the first transistor.

The output controller may include: a pull-up transistor which is turned on by the gate-on voltage of the pull-up node and outputs the scan clock signal to a scan output terminal and the scan signal line; and a pull-down transistor which is turned on by the gate-on voltage of the pull-down node and outputs the gate-off voltage to the scan output terminal and the scan signal line.

The output node controller may further include an eighth transistor which disables the pull-up node using the gate-off voltage or the scan clock signal in response to a next carry signal from a next stage.

The first transistor may have a gate electrode connected to the pull-up node, a first electrode connected to a second scan clock terminal and a second electrode connected to a previous carry terminal and a first electrode of the second transistor, the second transistor may have a gate electrode connected to the pull-down node, the first electrode connected to the second electrode of the first transistor and the previous carry terminal and a second electrode connected to a gate-off voltage supply terminal, the third transistor may have a gate electrode connected to the pull-up node, a first electrode connected to a first scan clock terminal and a second electrode connected to the pull-down node, the fourth transistor may have a gate electrode connected to the sensing signal terminal or the previous carry terminal, a first electrode connected to a gate-on voltage supply terminal and a second electrode connected to the pull-up node, the fifth transistor may have a gate electrode connected to the first scan clock terminal, the first electrode connected to the gate-on voltage supply terminal and a second electrode connected to the pull-down node, the sixth transistor may have a gate electrode connected to the second scan clock terminal, a first electrode connected to the pull-up node and a second electrode connected to the second electrode of the first transistor or a first electrode of the seventh transistor, and the seventh transistor may have a gate electrode connected to the pull-down node, the first electrode connected to the second electrode of the sixth transistor and a second electrode connected to the second electrode of the first transistor and the first capacitor.

The output controller may include: a pull-up transistor having a first electrode connected to the second scan clock terminal, a gate electrode connected to the pull-up node, and a second electrode connected to a scan output terminal; and a pull-down transistor having a first electrode connected to the scan output terminal, a gate electrode connected to the pull-down node, and a second electrode connected to a gate-off voltage supply terminal.

The output node controller may further include an eighth transistor including: a gate electrode connected to a next carry terminal, a first electrode connected to the previous carry terminal or the gate-off voltage supply terminal, and a second electrode connected to the pull-up node.

At least one of the second, fifth, sixth, and seventh transistors indirectly connected to the pull-up node among the first through eighth transistors included in the output node controller may include the first active layer including the first oxide semiconductor material, and at least one of the first, third, fourth, and eighth transistors directly connected to the pull-up node among the first through eighth transistors included in the output node controller may include the second active layer including the second oxide semiconductor material different from the first oxide semiconductor material of the first active layer.

A scan driver and a display device including the scan driver according to embodiments may reduce the electrical stress of thin-film transistors and improve reliability by improving the material of a semiconductor layer of a thin-film transistor which is subjected to stress due to the current amount or voltage bootstrapping, etc.

A scan driver and a display device including the scan driver according to embodiments may increase or stabilize electrical characteristics such as high-speed driving, operating range variation, and threshold voltage fluctuation suppression by improving the material of a semiconductor layer of at least one thin-film transistor directly connected to a pull-up node of each scan signal output stage.

However, the effects of the disclosure are not restricted to the one set forth herein. The above and other effects of the disclosure will become more apparent to one of daily skill in the art to which the disclosure pertains by referencing the claims.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
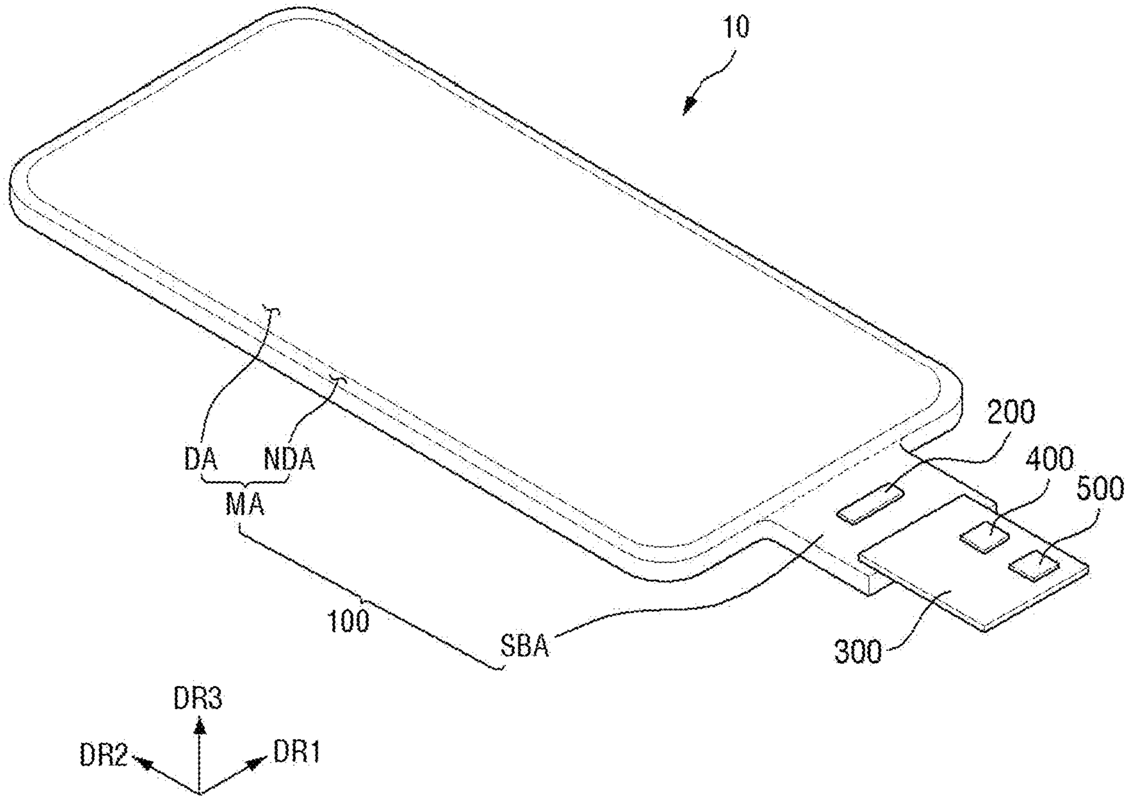
FIG. 1 is a schematic perspective view of a display device according to an embodiment.

In the following description, for the purposes of explanation, numerous specific details are set forth in order to provide a thorough understanding of various embodiments or implementations of the invention. As used herein, “embodiments” and “implementations” are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as “elements”), of the various embodiments may be otherwise combined, separated, interchanged, and/or rearranged without departing from the scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element or a layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the axis of the first direction DR1, the axis of the second direction DR2, and the axis of the third direction DR3 are not limited to three axes of a rectangular coordinate system, such as the X, Y, and Z-axes, and may be interpreted in a broader sense. For example, the axis of the first direction DR1, the axis of the second direction DR2, and the axis of the third direction DR3 may be perpendicular to one another, or may represent different directions that are not perpendicular to one another. For the purposes of this disclosure, "at least one of A and B" may be understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Hereinafter, specific embodiments will be described with reference to the accompanying drawings.

FIG. 1 is a schematic perspective view of a display device according to an embodiment.

Referring to FIG. 1, a display device 10 may be applied to portable electronic devices such as mobile phones, smartphones, tablet personal computers (PCs), mobile communication terminals, electronic notebooks, electronic books, portable multimedia players (PMPs), navigation devices, and ultra-mobile PCs (UMPCs). For example, the display device 10 may be applied to a display unit of a television, a notebook computer, a monitor, a billboard, or an Internet of things (IoT) device. For another example, the display device 10 may be applied to wearable devices such as smart watches, watch phones, glasses-type displays, and head mounted displays (HMDs).

The display device 10 may have a planar shape similar to a quadrangle. For example, the display device 10 may have a planar shape similar to a quadrangle having short sides extending in a first direction DR1 and long sides extending in a second direction DR2. Each corner portion where a short side extending in the first direction DR1 meets a long side extending in the second direction DR2 may be rounded at a selected curvature or may be right-angled. The planar shape of the display device 10 is not limited to the quadrangular shape but may also be similar to other polygonal shapes, a circular shape, or an elliptical shape.

The display device 10 may include a display panel 100, a display driver 200, a circuit board 300, a touch driver 400, and a power supply unit 500.

The display panel 100 may include a main area MA and a sub-area SBA.

The main area MA may include a display area DA including pixels PX that display an image and a non-display area NDA around the display area DA. The display area DA may emit light from emission areas or opening areas. For example, the display panel 100 may include pixel circuits including switching elements, a pixel defining layer defining the emission areas or the opening areas, and self-light emitting elements.

For example, each of the self-light emitting elements may include at least one of an organic light emitting diode including an organic light emitting layer, a quantum dot light emitting diode including a quantum dot light emitting layer, an inorganic light emitting diode including an inorganic semiconductor, and a micro light emitting diode. However, embodiments are not limited thereto.

The non-display area NDA may be an area outside the display area DA. The non-display area NDA may be defined as an edge area of the main area MA of the display panel 100. The non-display area NDA may include a gate driver which supplies gate signals to gate lines and fan-out lines which connect the display driver 200 and the display area DA.

The sub-area SBA may extend from a side of the main area MA. The sub-area SBA may include a flexible material that is bendable, foldable, rollable, etc. For example, in case that the sub-area SBA is bent, the sub-area SBA may overlap the main area MA in a thickness direction (e.g., a third direction DR3). The sub-area SBA may include the display driver 200 and pad units connected to the circuit board 300. In another example, the sub-area SBA may be omitted, and the display driver 200 and the pad units may be disposed in the non-display area NDA.

The display driver 200 may output signals and voltages for driving the display panel 100. The display driver 200 may supply data voltages to data lines DL. The display driver 200 may supply a power supply voltage to a power line and supply a gate control signal to a scan driver (or the gate driver). The display driver 200 may be formed as an integrated circuit (IC) and mounted on the display panel 100 by a chip on glass (COG) method, a chip on plastic (COP) method, or an ultrasonic bonding method. For example, the display driver 200 may be disposed in the sub-area SBA and may overlap the main area MA in the thickness direction (e.g., third direction DR3) by the bending of the sub-area SBA. For another example, the display driver 200 may be mounted on the circuit board 300.

The circuit board 300 may be attached onto the pad units of the display panel 100 using an anisotropic conductive layer. Lead lines of the circuit board 300 may be electrically connected to the pad units of the display panel 100. The circuit board 300 may be a flexible printed circuit board, a printed circuit board, or a flexible film such as a chip on film.

The touch driver 400 may be mounted on the circuit board 300. The touch driver 400 may be electrically connected to a touch sensing unit of the display panel 100. The touch driver 400 may supply a touch driving signal to touch electrodes of the touch sensing unit and sense a change in capacitance between the touch electrodes. For example, the touch driving signal may be a pulse signal having a selected frequency. The touch driver 400 may determine whether an input has been made and calculate coordinates of the input based on a change in capacitance between the touch electrodes. The touch driver 400 may be formed as an integrated circuit (IC).

The power supply unit 500 may be disposed on the circuit board 300 to supply a power supply voltage to the display driver 200 and the display panel 100. The power supply unit 500 may generate a first driving voltage and supply the first driving voltage to first driving voltage lines VDL, may generate an initialization voltage and supply the initialization voltage to initialization voltage lines, and may generate a common voltage and supply the common voltage to a common electrode for light emitting elements of pixels PX. For example, the first driving voltage may be a high potential voltage for driving the light emitting elements, and each of the common voltage and the second driving voltage may be a low potential voltage for driving the light emitting elements.

Figure 2:
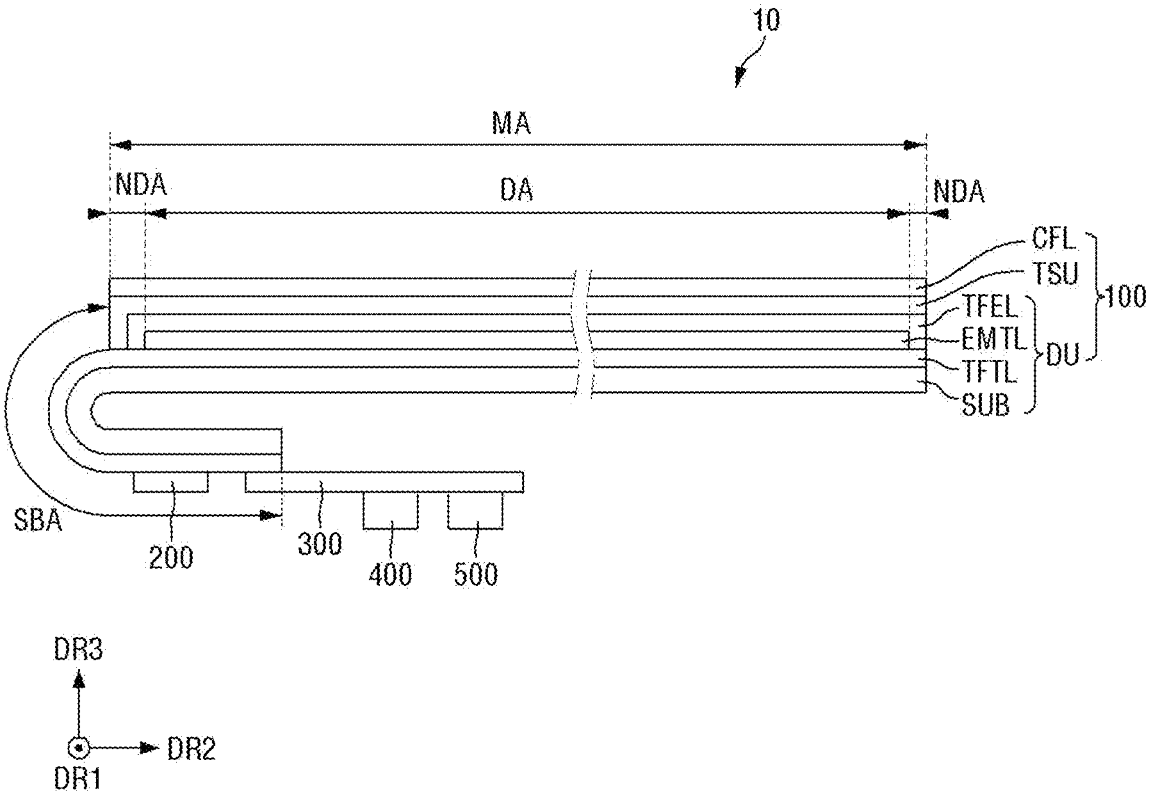
FIG. 2 is a schematic cross-sectional view of the display device according to the embodiment.

FIG. 2 is a schematic cross-sectional view of the display device according to the embodiment.

Referring to FIG. 2, the display panel 100 may include a display unit DU, a touch sensing unit TSU, and a color filter layer CFL. The display unit DU may include a substrate SUB, a thin-film transistor layer TFTL, a light emitting element layer EMTL, and an encapsulation layer TFEL.

The substrate SUB may be a base substrate or a base member. The substrate SUB may be a flexible substrate that is bendable, foldable, rollable, etc. For example, the substrate SUB may include polymer resin such as polyimide (PI), but embodiments are not limited thereto. For another example, the substrate SUB may include a glass material or a metal material.

The thin-film transistor layer TFTL may be disposed on the substrate SUB. The thin-film transistor layer TFTL may include thin-film transistors of pixel circuits of pixels PX. The thin-film transistor layer TFTL may further include gate lines GL, data lines DL, power lines, gate control lines GSL1 and GSL2, fan-out lines FL connecting the display driver 200 and the data lines DL, and lead lines connecting the display driver 200 and pad units. Each of the thin-film transistors may include a semiconductor region, a source electrode, a drain electrode, and a gate electrode. For example, in case that the scan driver 610 (e.g., the gate driver) is formed on a side of the non-display area NDA of the display panel 100, the scan driver 610 may include thin-film transistors.

The thin-film transistor layer TFTL may be disposed in the display area DA, the non-display area NDA, and the sub-area SBA. The thin-film transistors of the pixels PX, the gate lines GL, the data lines DL, and the power lines of the thin-film transistor layer TFTL may be disposed in the display area DA. The gate control lines GSL1 and GSL2 and the fan-out lines FL of the thin-film transistor layer TFTL may be disposed in the non-display area NDA. The lead lines of the thin-film transistor layer TFTL may be disposed in the sub-area SBA.

The light emitting element layer EMTL may be disposed on the thin-film transistor layer TFTL. The light emitting element layer EMTL may include light emitting elements, each including a pixel electrode, a light emitting layer and a common electrode sequentially stacked to emit light, and a pixel defining layer defining the pixels PX. The light emitting elements of the light emitting element layer EMTL may be disposed in the display area DA.

The light emitting layer may be an organic light emitting layer including an organic material. The light emitting layer may include a hole transporting layer, an organic light emitting layer, and an electron transporting layer. In case that the pixel electrode receives a selected voltage through a thin-film transistor of the thin-film transistor layer TFTL and the common electrode receives a cathode voltage, holes and electrons may move to the organic light emitting layer through the hole transporting layer and the electron transporting layer, respectively. For example, the holes and the electrons may be combined with each other in the organic light emitting layer to emit light. For example, the pixel electrode may be an anode electrode, and the common electrode may be a cathode electrode, but embodiments are not limited thereto.

For another example, each of the light emitting elements may include a quantum dot light emitting diode including a quantum dot light emitting layer, an inorganic light emitting diode including an inorganic semiconductor, or a micro light emitting diode.

The encapsulation layer TFEL may cover upper and side surfaces of the light emitting element layer EMTL and may protect the light emitting element layer EMTL. The encapsulation layer TFEL may include at least one inorganic layer and at least one organic layer to encapsulate the light emitting element layer EMTL.

The touch sensing unit TSU may be disposed on the encapsulation layer TFEL. The touch sensing unit TSU may include touch electrodes for sensing a user's touch in a capacitive manner and touch lines connecting the touch electrodes and the touch driver 400. For example, the touch sensing unit TSU may sense a user's touch in a mutual capacitance manner or a self-capacitance manner.

For another example, the touch sensing unit TSU may be disposed on a separate substrate disposed on the display unit DU. For example, the substrate that supports the touch sensing unit TSU may be a base member that encapsulates the display unit DU.

The touch electrodes of the touch sensing unit TSU may be disposed in a touch sensor area overlapping the display area DA. The touch lines of the touch sensing unit TSU may be disposed in a touch peripheral area overlapping the non-display area NDA.

The color filter layer CFL may be disposed on the touch sensing unit TSU. The color filter layer CFL may include color filters corresponding to emission areas, respectively. Each of the color filters may selectively transmit light of a specific wavelength and block or absorb light of other wavelengths. The color filter layer CFL may absorb a part of light coming from the outside of the display device 10, thereby reducing reflected light caused by the external light. Therefore, the color filter layer CFL may prevent color distortion caused by reflection of external light.

Since the color filter layer CFL is directly disposed on the touch sensing unit TSU, the display device 10 may not require a separate substrate for the color filter layer CFL. Therefore, a thickness of the display device 10 may be relatively reduced.

The sub-area SBA of the display panel 100 may extend from a side of the main area MA. The sub-area SBA may include a flexible material that is bendable, foldable, rollable, etc. For example, in case that the sub-area SBA is bent, the sub-area SBA may overlap the main area MA in the thickness direction (e.g., third direction DR3). The sub-area SBA may include the display driver 200 and the pad units electrically connected to the circuit board 300.

Figure 3:
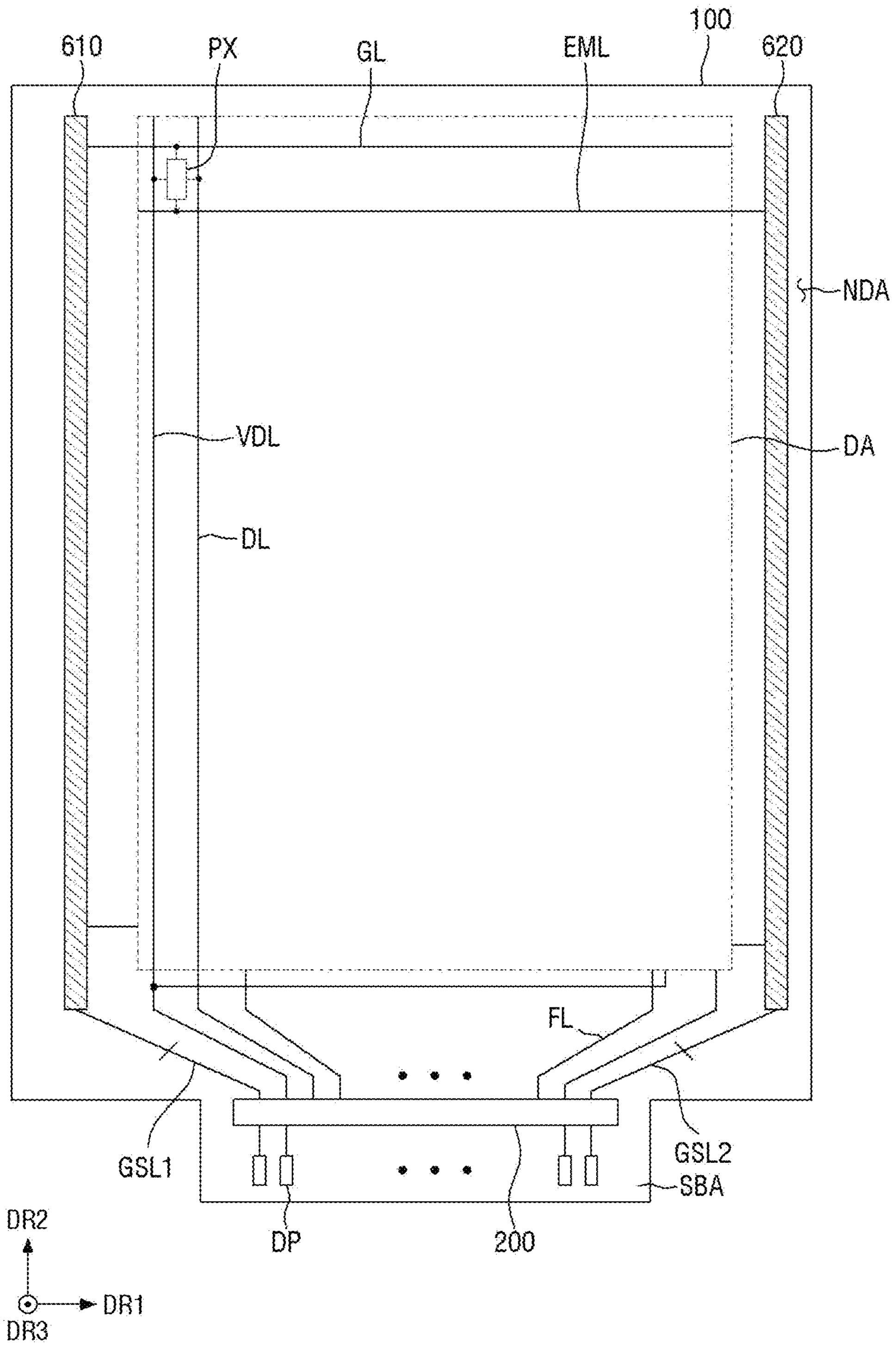
FIG. 3 is a schematic plan view of a display unit of the display device according to the embodiment.
Figure 4:
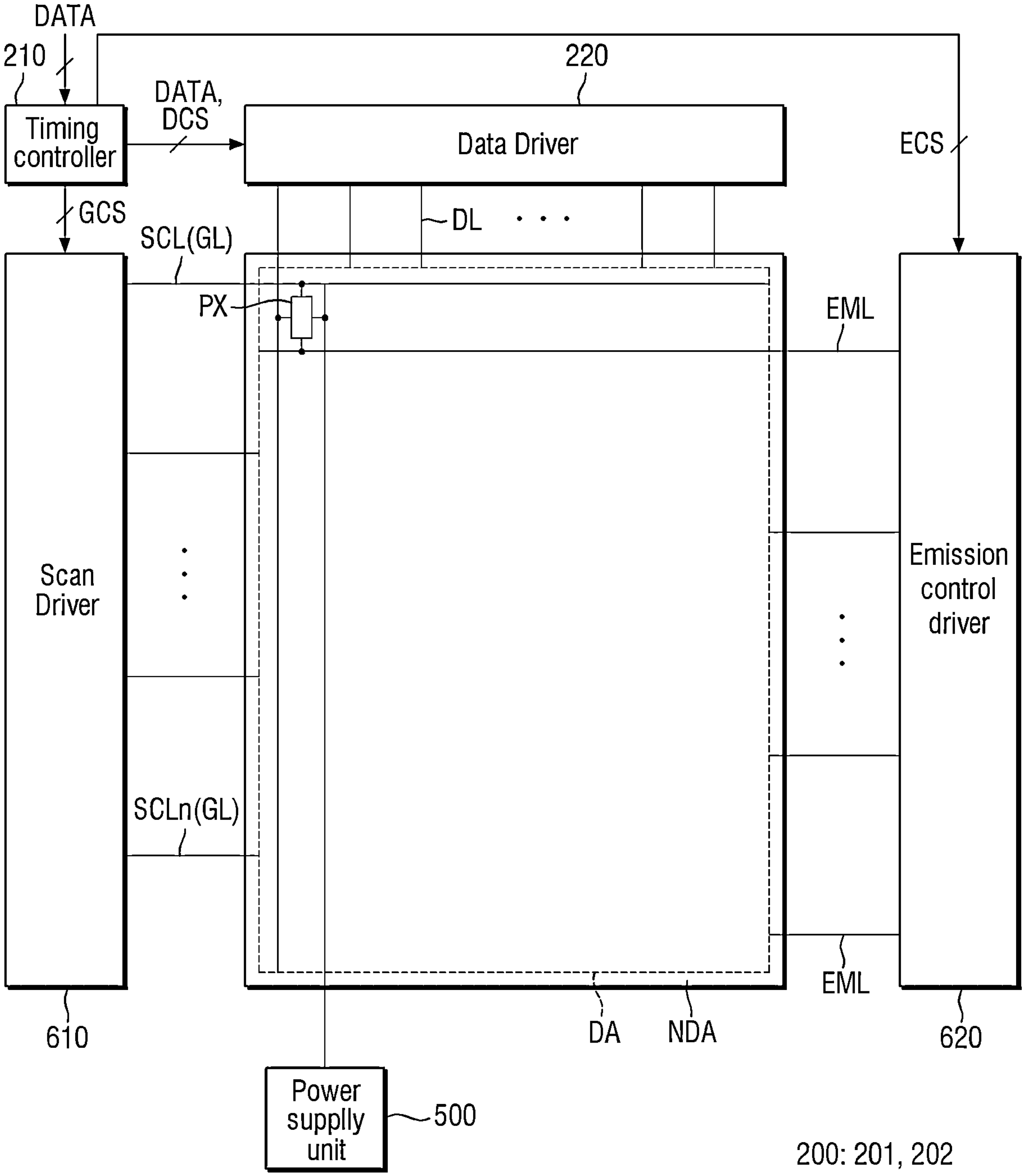
FIG. 4 is a block diagram of a display panel and a display driver according to an embodiment.

FIG. 3 is a schematic plan view of a display unit of the display device 10 according to the embodiment. FIG. 4 is a block diagram of a display panel 100 and a display driver 200 according to an embodiment.

Referring to FIGS. 3 and 4, the display panel 100 may include the display area DA and the non-display area NDA.

The display area DA may include pixels PX, first driving voltage lines VDL connected to the pixels PX, second driving voltage lines, gate lines GL, emission control lines EML, and data lines DL.

Each of the pixels PX may be connected to a gate line GL, a data line DL, an emission control line EML, a first driving voltage line VDL, and a second driving voltage line. Each of the pixels PX may include at least one transistor, a light emitting element, and a capacitor.

The gate lines GL may extend in the first direction DR1 and may be spaced apart from each other in the second direction DR2 intersecting the first direction DR1. The gate lines GL may be arranged along the second direction DR2. The gate lines GL may sequentially supply gate signals to the pixels PX.

The emission control lines EML may extend in the first direction DR1 and may be spaced apart from each other in the second direction DR2. The emission control lines EML may be arranged along the second direction DR2. The emission control lines EML may sequentially supply emission control signals to the pixels PX.

The data lines DL may extend in the second direction DR2 and may be spaced apart from each other in the first direction DR1. The data lines DL may be arranged along the first direction DR1. The data lines DL may supply data voltages to the pixels PX. The data voltage may determine luminance of each of the pixels PX.

The first driving voltage lines VDL may extend in the second direction DR2 and may be spaced apart from each other in the first direction DR1. The first driving voltage lines VDL may be arranged along the first direction DR1. The first driving voltage lines VDL may supply first driving voltages to the pixels PX. The first driving voltages may be high potential voltages for driving the light emitting elements of the pixels PX.

The non-display area NDA may surround the display area DA. The non-display area NDA may include a scan driver 610, an emission control driver 620, fan-out lines FL, a first gate control line GSL1, and a second gate control line GSL2.

The fan-out lines FL may extend from the display driver 200 to the display area DA. The fan-out lines FL may supply data voltages received from the display driver 200 to the data lines DL.

The first gate control line GSL1 may extend from the display driver 200 to the scan driver 610. The first gate control line GSL1 may supply a gate control signal GCS received from the display driver 200 to the scan driver 610.

The second gate control line GSL2 may extend from the display driver 200 to the emission control driver 620. The second gate control line GSL2 may supply an emission control signal ECS received from the display driver 200 to the emission control driver 620.

The sub-area SBA may extend from a side of the non-display area NDA. The sub-area SBA may include the display driver 200 and pad units DP. The pad units DP may be disposed closer to an edge portion of the sub-area SBA than the display driver 200. The pad units DP may be electrically connected to the circuit board 300 through an anisotropic conductive film (ACF).

The display driver 200 may include a timing controller 210 and a data driver 220.

The timing controller 210 may receive digital video data DATA and timing signals from the circuit board 300. The timing controller 210 may control the operation timing of the data driver 220 by generating a data control signal DCS based on the timing signals, may control the operation timing of the scan driver 610 by generating the gate control signal GCS, and may control the operation timing of the emission control driver 620 by generating the emission control signal ECS. The timing controller 210 may supply the gate control signal GCS to the scan driver 610 through the first gate control line GSL1. The timing controller 210 may supply the emission control signal ECS to the emission control driver 620 through the second gate control line GSL2. The timing controller 210 may supply the digital video data DATA and the data control signal DCS to the data driver 220.

The data driver 220 may convert the digital video data DATA into analog data voltages and supply the analog data voltages to the data lines DL through the fan-out lines FL. Gate signals of the scan driver 610 may select pixels PX to which the data voltages are to be supplied, and the selected pixels PX may receive the data voltages through the data lines DL.

The power supply unit 500 may be disposed on the circuit board 300 to supply power supply voltages to the display driver 200 and the display panel 100. The power supply unit 500 may generate first driving voltages and supply the first driving voltages to the first driving voltage lines VDL, may generate initialization voltages and supply the initialization voltages to the initialization voltage lines, and may generate a common voltage and supply the common voltage to the common electrode common to the light emitting elements of the pixels PX.

The scan driver 610 may be disposed outside a side of the display area DA or on a side of the non-display area NDA, and the emission control driver 620 may be disposed outside another side of the display area DA or on another side of the non-display area NDA. However, embodiments are not limited thereto. For another example, the scan driver 610 and the emission control driver 620 may be disposed on either the side or another side of the non-display area NDA.

The scan driver 610 may include transistors that generate gate signals based on the gate control signal GCS. The emission control driver 620 may include transistors that generate emission control signals based on the emission control signal ECS. For example, the transistors of the scan driver 610, the transistors of the emission control driver 620, and the transistors of the pixels PX may be formed on the same layer. The scan driver 610 may supply the gate signals to the gate lines GL, and the emission control driver 620 may supply the emission control signals to the emission control lines EML.

Figure 5:
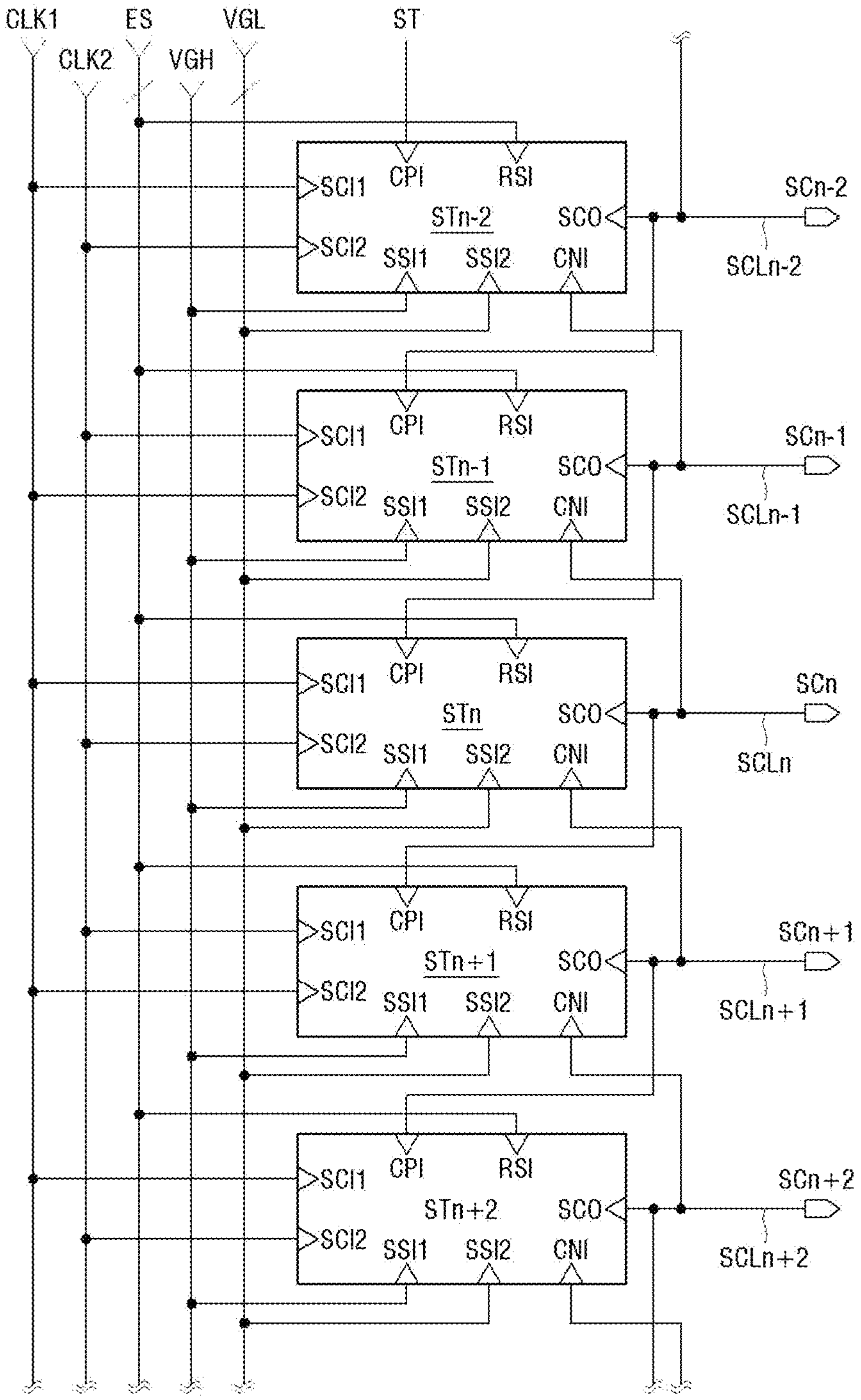
FIG. 5 is a schematic diagram of a scan driver according to an embodiment.

FIG. 5 is an example diagram of a scan driver according to an embodiment.

Referring to FIG. 5, the scan driver 610 according to an embodiment may include stages that are connected (e.g., dependently connected) to each other, e.g., $n^{th}$ stage STn. Here, n may be a positive integer.

In FIG. 5, for case of description, only $(n-2)^{th}$ through $(n+2)^{th}$ stages STn−2 through STn+2 are illustrated based on an $n^{th}$ stage STn.

In the following description, a "previous stage" refers to a stage disposed in front of the $n^{th}$ stage STn. A "next stage" refers to a stage disposed behind the $n^{th}$ stage STn. For example, a previous stage of the $n^{th}$ stage STn may indicate the $(n-1)^{th}$ stage STn−1, and a next stage of the $n^{th}$ stage STn may indicate the $(n+1)^{th}$ stage STn+1.

Scan clock lines and sensing control lines may be disposed on a side of the $(n-2)^{th}$ through $(n+2)^{th}$ stages STn−2 through STn+2. Scan clock signals CLK1 and CLK2 whose phases are sequentially delayed or alternated are applied to the scan clock lines, respectively, and a start signal ST, a line selection signal ES and a reset signal may be transmitted to the sensing control lines, respectively.

The scan clock signals CLK1 and CLK2, the line selection signal ES, the start signal ST, and the reset signal may be gate control signals GCS generated from the display driver 200 and transmitted through first gate control lines GSL1. In FIG. 5, two scan clock lines, two sensing control lines, and two power lines are illustrated as the first gate control lines GSL1. However, the number of scan clock lines and sensing control lines is not limited thereto.

The scan driver 610 may include the $(n-2)^{th}$ through $(n+2)^{th}$ stages STn−2 through STn+2 connected to the first gate control lines GSL1, respectively. Among the $n^{th}$ stages STn, the $(n-2)^{th}$ stage STn−2 may output an $(n-2)^{th}$ scan signal SCn−2 to an $(n-2)^{th}$ scan signal line SCLn−2, and the $(n-1)^{th}$ stage STn−1 may output an $(n-1)^{th}$ scan signal SCn−1 to an $(n-1)^{th}$ scan signal line SCLn−1. Accordingly, the $n^{th}$ stage STn may output an $n^{th}$ scan signal SCn to an $n^{th}$ scan signal line SCLn. Next, the $(n+1)^{th}$ stage STn+1 may output an $(n+1)^{th}$ scan signal SCn+1 to an $(n+1)^{th}$ scan signal line SCLn+1, and the $(n+2)^{th}$ stage STn+2 may output an $(n+2)^{th}$ scan signal SCn+2 to an $(n+2)^{th}$ scan signal line SCLn+2.

Each of the $(n-2)^{th}$ through $(n+2)^{th}$ stages STn−2 through STn+2 may include a previous carry terminal CPI, a next carry terminal CNI, a first scan clock terminal SCI1, a second scan clock terminal SCI2, a first power supply terminal SSI1, a second power supply terminal SSI2, a sensing signal terminal RSI, and a scan output terminal SCO.

In case that the $(n-2)^{th}$ stage STn−2 is a first stage, the start signal ST may be input to the previous carry terminal CPI of the $(n-2)^{th}$ stage STn−2 through a start signal line. The previous carry terminal CPI of each of the stages connected (e.g., dependently connected) except that the first stage is connected to the scan output terminal SCO of an immediately previous stage. For example, as illustrated in FIG. 5, the previous carry terminal CPI of the $n^{th}$ stage STn may be connected to the scan output terminal SCO of the $(n-1)^{th}$ stage STn−1.

The next carry terminal CNI of each of the $(n-2)^{th}$ through $(n+2)^{th}$ stages STn−2 through STn+2 may be connected to the scan output terminal SCO of any one next stage. For example, as illustrated in FIG. 5, the next carry terminal CNI of the $n^{th}$ stage STn may be connected to the scan output terminal SCO of the $(n+1)^{th}$ stage STn+1 and may receive the scan signal SCn+1 of the $(n+1)^{th}$ stage STn+1 as a next carry signal.

The scan output terminals SCO of the $(n-2)^{th}$ through $(n+2)^{th}$ stages STn−2 through STn+2 may be sequentially connected to scan signal lines SCLn−2 to SCLn+2, which are corresponding gate lines GL, respectively. Accordingly, each of the scan signal lines SCLn−2 to SCLn+2 may be connected one-to-one to the scan output terminals SCO of all stages STn−2 through STn+2. For example, the $(n-1)^{th}$ scan signal line SCLn−1 may be connected to the scan output terminal SCO of the $(n-1)^{th}$ stage STn−1, and the $n^{th}$ scan signal line SCLn may be connected to the scan output terminal SCO of the $n^{th}$ stage STn. For example, the $(n+1)^{th}$ scan signal line SCLn+1 may be connected to the scan output terminal SCO of the $(n+1)^{th}$ stage STn+1.

The sensing signal terminal RSI of each of the $(n-2)^{th}$ through $(n+2)^{th}$ stages STn−2 through STn+2 may receive the line selection signal ES through a sensing control line to which the line selection signal ES is transmitted.

Each of the $(n-2)^{th}$ through $(n+2)^{th}$ stages STn−2 through STn+2 may receive two scan clock signals, e.g., first and second scan clock signals CLK1 and CLK2 whose phases are sequentially alternated or delayed through the first scan clock terminal SCI1 and the second scan clock terminal SCI2.

For example, each of the $(n-2)^{th}$ through $(n+2)^{th}$ stages STn−2 through STn+2 may receive the first scan clock signal CLK1 through the first scan clock terminal SCI1 and receive the second scan clock signal CLK2 whose phase is sequentially alternated or delayed from the first scan clock signal CLK1 through the second scan clock terminal SCI2.

The $(n-2)^{th}$ through $(n+2)^{th}$ stages STn−2 through STn+2 may sequentially output the scan signals SCn−2 through SCn+2 to the scan signal lines SCLn−2 through SCLn+2 connected one-to-one thereto through their respective scan output terminals SCO, respectively. For example, during at least one frame period, the $(n-2)^{th}$ stage STn−2 may transmit the $(n-2)^{th}$ scan signal SCn−2 to the $(n-2)^{th}$ scan signal line SCLn−2 connected to the scan output terminal SCO. Next, the $(n-1)^{th}$ stage STn−1 may output the $(n-1)^{th}$ scan signal SCn−1 to the $(n-1)^{th}$ scan signal line SCLn−1 connected to the scan output terminal SCO. Accordingly, the $n^{th}$ stage STn may output the $n^{th}$ scan signal SCn to the $n^{th}$ scan signal line SCLn connected to the scan output terminal SCO. Subsequently, the $(n+1)^{th}$ stage STn+1 may output the $(n+1)^{th}$ scan signal SCn+1 to the $(n+1)^{th}$ scan signal line SCLn+1 connected to the scan output terminal SCO, and the $(n+2)^{th}$ stage STn+2 may output the $(n+2)^{th}$ scan signal SCn+2 to the $(n+2)^{th}$ scan signal line SCLn+2 connected to the scan output terminal SCO.

For example, the scan driver 610 may be composed of stages ST1 to STn that sequentially output first to $n^{th}$ scan signals SCI to SCn for each active period during each frame period. Specific structure of the scan driver 610 has been described through FIG. 5

The emission control driver 620 which sequentially generates and outputs emission signals in response to the emission control signal ECS received from the display driver 200 may also be structured to include the $(n-2)^{th}$ through $(n+2)^{th}$ stages STn−2 through STn+2, e.g., the $n^{th}$ stages STn. Therefore, a description of the detailed structure of the emission control driver 620 will be replaced with the description of the scan driver 610.

Figure 6:
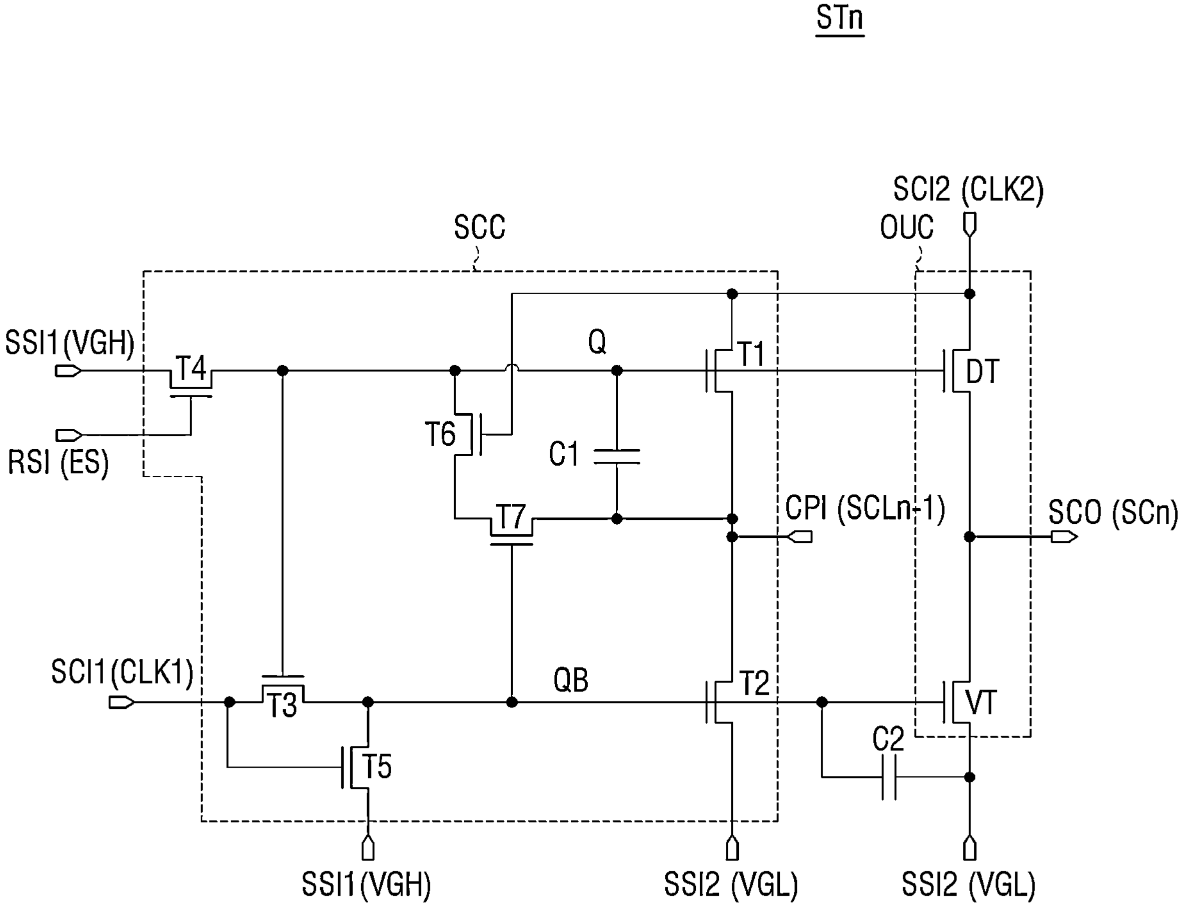
FIG. 6 is a schematic diagram of an equivalent circuit of a first embodiment of an $n^{th}$ stage of the scan driver illustrated in FIG. 5.

FIG. 6 is a schematic diagram of an equivalent circuit of a first embodiment of an $n^{th}$ stage of the scan driver illustrated in FIG. 5. FIG. 6 illustrates the $n^{th}$ stage STn among the $(n-2)^{th}$ through $(n+2)^{th}$ stages STn−2 through STn+2 as an example.

The $n^{th}$ stage STn may include an output node controller SCC and an output controller OUC. For example, the $n^{th}$ stage STn may further include a first power supply terminal SSI1 to which a gate-on voltage VGH is supplied, and a second power supply terminal SSI2 to which a gate-off voltage VGL is supplied.

The $n^{th}$ stage STn may operate in response to the start signal ST received through the previous carry terminal CPI. However, in case that the $n^{th}$ stage STn is connected (e.g., dependently connected) to the previous $(n-1)^{th}$ stage STn−1, the $n^{th}$ stage STn may operate in response to the $(n-1)^{th}$ scan signal SCn−1 of the $(n-1)^{th}$ stage STn−1 received as a carry signal. An example in which the $n^{th}$ stage STn is any one $n^{th}$ stage STn that is connected (e.g., dependently connected) to the previous $(n-1)^{th}$ stage STn−1 will be described below.

The output node controller SCC of the $n^{th}$ stage STn may enable the output controller OUC by supplying a voltage of the same level as the gate-on voltage VGH to a pull-up node Q during the active period of each frame period. In case that the pull-up node Q is maintained at the level of the gate-on voltage VGH, the gate-off voltage VGL of the second power supply terminal SSI2 may be applied to a pull-down node QB.

For example, the output node controller SCC may supply the gate-on voltage VGH to the pull-up node Q in response to the line selection signal ES input during the active period or a carry signal of a previous stage, e.g., the $(n-1)^{th}$ scan signal SCn−1 of the $(n-1)^{th}$ stage STn−1. Here, the line selection signal ES or the carry signal of the previous stage may be at the level of the gate-on voltage. In case that the gate-on voltage VGH is applied to the pull-up node Q of the output node controller SCC, the pull-up node Q of the output node controller SCC may be enabled according to the level of the gate-on voltage VGH. The output node controller SCC may control the gate-off voltage VGL to be supplied to the pull-down node QB during a period in which the gate-on voltage VGH is applied to the pull-up node Q.

In case that the pull-up node Q of the output node controller SCC is enabled, the output controller OUC may output the $n^{th}$ scan signal SCn to the $n^{th}$ scan signal line SCLn connected to the scan output terminal SCO in response to any one scan clock signal CLK2 of the scan clock signals CLK1 and CLK2.

After the $n^{th}$ scan signal SCn is output, the output node controller SCC may control the gate-off voltage VGL to be supplied to the pull-up node Q in response to any one scan clock signal CLK1 of the scan clock signals CLK1 and CLK2 or the $(n+1)^{th}$ scan signal SCn+1 of the $(n+1)^{th}$ stage STn+1). The pull-up node Q may be disabled by the gate-off voltage VGL.

The output node controller SCC may enable the pull-down node QB with the gate-on voltage VGH in response to the any one scan clock signal CLK1 of the scan clock signals CLK1 and CLK2 during a period in which the pull-up node Q is disabled.

In case that the pull-down node QB of the output node controller SCC is enabled, the output controller OUC may electrically connect the $n^{th}$ scan signal line SCLn to the second power supply terminal SSI2 to which the gate-off voltage VGL is applied.

The $(n-2)^{th}$ through $(n+2)^{th}$ stages STn−2 through STn+2 may output the $n^{th}$ scan signals SCn to their respective scan signal lines SCLn and sequentially and repeatedly perform an operation of maintaining their respective scan signal lines SCLn at the gate-off voltage VGL.

The output node controller SCC of the $n^{th}$ stage STn may include first through seventh transistors T1 through T7 and at least one first capacitor C1. Any one of first and second electrodes of each of the first through seventh transistors T1 through T7 may be a source electrode, and the other may be a drain electrode.

For example, a gate electrode of the first transistor T1 may be connected to the pull-up node Q, the first electrode of the first transistor T1 may be connected to the second scan clock terminal SCI2, and the second electrode of the first transistor T1 may be connected to the previous carry terminal CPI and the first electrode of the second transistor T2. The first transistor T1 may be turned on in case that the pull-up node Q is enabled by the gate-on voltage VGH and may supply the second scan clock signal CLK2 to the first capacitor C1 connected to the first transistor T1 in parallel and the second transistor T2.

A gate electrode of the second transistor T2 may be connected to the pull-down node QB, and the first electrode of the second transistor T2 may be connected to the second electrode of the first transistor T1 and the previous carry terminal CPI. For example, the second electrode of the second transistor T2 may be connected to the second power supply terminal SSI2. The second transistor T2 may be turned on in case that the pull-down node QB is enabled by the gate-on voltage VGH and may supply the gate-off voltage VGL to the first transistor T1.

A gate electrode of the third transistor T3 may be connected to the pull-up node Q, and the first electrode of the third transistor T3 may be connected to the first scan clock terminal SCI1. For example, the second electrode of the third transistor T3 may be connected to the pull-down node QB. The third transistor T3 may be turned on in case that the pull-up node Q is enabled by the gate-on voltage VGH and may supply the first scan clock signal CLK1 to the pull-down node QB.

A gate electrode of the fourth transistor T4 may be connected to the sensing signal terminal RSI or the previous carry terminal CPI, and the first electrode of the fourth transistor T4 may be connected to the first power supply terminal SSI1. For example, the second electrode of the fourth transistor T4 may be connected to the pull-up node Q. The fourth transistor T4 may be turned on in response to the line selection signal ES of the sensing signal terminal RSI or the previous carry signal and may supply the gate-on voltage VGH to the pull-up node Q. Accordingly, the fourth transistor T4 may enable the pull-up node Q at the level of the gate-on voltage VGH in response to the line selection signal ES of the sensing signal terminal RSI or the previous carry signal.

A gate electrode of the fifth transistor T5 may be connected to the first scan clock terminal SCI1, and the first electrode of the fifth transistor T5 may be connected to the first power supply terminal SSI1. For example, the second electrode of the fifth transistor T5 may be connected to the pull-down node QB. The fifth transistor T5 may be turned on in response to the first scan clock signal CLK1 and may supply the gate-on voltage VGH to the pull-down node QB. Accordingly, the fifth transistor T5 may enable the pull-down node QB at the level of the gate-on voltage VGH in response to the first scan clock signal CLK1.

A gate electrode of the sixth transistor T6 may be connected to the second scan clock terminal SCI2, and the first electrode of the sixth transistor T6 may be connected to the pull-up node Q. For example, the second electrode of the sixth transistor T6 may be connected to the second electrode of the first transistor T1 or the first electrode of the seventh transistor T7. Accordingly, the sixth transistor T6 may electrically connect the pull-up node Q to the second electrode of the first transistor T1 or the first electrode of the seventh transistor T7 in response to the second scan clock terminal SCI2. The sixth transistor T6 may function as a diode between the pull-up node Q and the first capacitor C1.

A gate electrode of the seventh transistor T7 may be connected to the pull-down node QB, and the first electrode of the seventh transistor T7 may be connected to the second electrode of the sixth transistor T6. For example, the second electrode of the seventh transistor T7 may be connected to the second electrode of the first transistor T1 and the first capacitor C1. The seventh transistor T7 may be turned on in case that the pull-down node QB is enabled and electrically connects the second electrode of the sixth transistor T6 to the first capacitor C1 and the second electrode of the first transistor T1. The seventh transistor T7 may function as a diode to keep the sixth transistor T6 and the first transistor T1 turned off during the enable period of the pull-down node QB.

The output controller OUC may include a pull-up transistor DT and a pull-down transistor VT.

The pull-up transistor DT may have a first electrode connected to the second scan clock terminal SCI2, a gate electrode connected to the pull-up node Q, and a second electrode connected to the scan output terminal SCO. The pull-up transistor DT may be turned on by the gate-on voltage VGH of the pull-up node Q and may output any one scan clock signal input to the second scan clock terminal SCI2, for example, the second scan clock signal CLK2 to the scan output terminal SCO. Accordingly, the $n^{th}$ scan signal SCn having the gate-on voltage may be supplied to the $n^{th}$ scan signal line SCLn.

The pull-down transistor VT may have a first electrode connected to the scan output terminal SCO, a gate electrode connected to the pull-down node QB, and a second electrode connected to the second power supply terminal SSI2. A second capacitor C2 may be connected between the gate electrode and the second electrode of the pull-down transistor VT. The pull-down transistor VT may be turned on by the gate-on voltage VGH of the pull-down node QB and may transmit the gate-off voltage VGL inputted to the second power supply terminal SSI2 to the scan output terminal SCO. Therefore, the $n^{th}$ scan signal line SCLn connected to the scan output terminal SCO may be maintained at the level of the gate-off voltage VGL during the turn-on period of the pull-down transistor VT.

Figure 7:
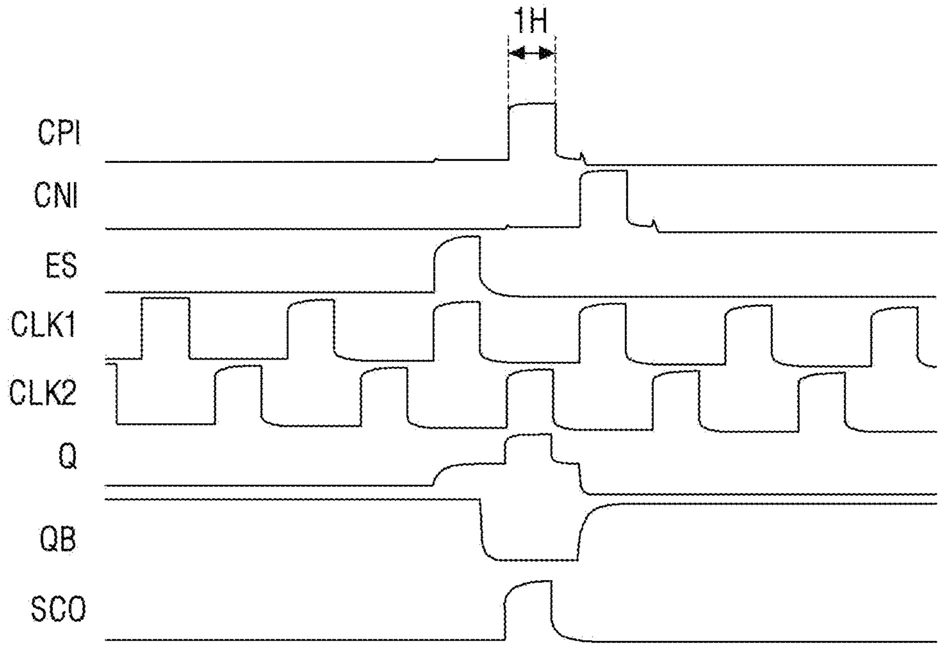
FIG. 7 is a waveform diagram illustrating changes in the voltage levels of sensing control signals, scan clock signals, and a pull-up node during an active period of an N-th frame period.

FIG. 7 is a waveform diagram illustrating changes in the voltage levels of sensing control signals, scan clock signals, and a pull-up node during an active period of an N-th frame period. Here, N may be a positive integer.

Referring to FIG. 7, the line selection signal ES, the start signal ST, and the first and second scan clock signals CLK1 and CLK2 may be signals that are generated at the level of the gate-on voltage VGH during one horizontal period 1H. The line selection signal ES may be generated every one horizontal period 1H so that the gate-on voltage VGH may be supplied to the pull-up node Q of each of the stages STn−2 through STn+2 during the active period. Although the line selection signal ES is not generated and supplied, the line selection signal ES may be replaced with the start signal ST or a carry signal from a previous stage (e.g., a previous carry signal).

The first and second scan clock signals CLK1 and CLK2 may be clock signals whose phases are sequentially delayed or repeatedly alternated. Each of the first and second scan clock signals CLK1 and CLK2 may be generated at the level of the gate-on voltage VGH for at least one horizontal period 1H and may be generated at the level of the gate-off voltage VGL for at least one horizontal period 1H. Here, the generation period, pulse width, and amplitude of each of the first and second scan clock signals CLK1 and CLK2 are not limited to those of FIG. 7 and may be variously changed.

The gate-on voltage VGH may be the gate-high voltage that turns on transistors included in each of the $(n-2)^{th}$ through $(n+2)^{th}$ stages STn−2 through STn+2 of the scan driver 610 and transistors of pixels (or subpixels) PX. The gate-off voltage VGL may be the gate-low-voltage that turns off the transistors of the $(n-2)^{th}$ through $(n+2)^{th}$ stages STn−2 through STn+2 of the scan driver 610 and the transistors of the pixels (or subpixels) PX.

The operation of the $n^{th}$ stage STn during any one frame will be briefly described below with reference to FIGS. 6 and 7.

First, the fourth transistor T4 may be turned on in response to the line selection signal ES of the sensing signal terminal RSI or the start signal ST and may supply the gate-on voltage VGH to the pull-up node Q. Accordingly, the pull-up node Q may be enabled.

Next, the first transistor T1 may be turned on in case that the pull-up node Q is enabled by the gate-on voltage VGH and charges the first capacitor C1. For example, the pull-up transistor DT may be turned on by the gate-on voltage VGH of the pull-up node Q and may output the second scan clock signal CLK2, which is input to the second scan clock terminal SCI2, to the scan output terminal SCO. Accordingly, the pull-up node Q may be bootstrapped, and the $n^{th}$ scan signal SCn having the gate-on voltage VGH may be supplied to the $n^{th}$ scan signal line SCLn.

Thereafter, the fifth transistor T5 may be turned on in response to the first scan clock signal CLK1 and may enable the pull-down node QB at the level of the gate-on voltage VGH. The pull-down transistor VT may be turned on by the gate-on voltage VGH of the pull-down node QB and may transmit the gate-off voltage VGL inputted to the second power supply terminal SSI2 to the scan output terminal SCO. Therefore, the $n^{th}$ scan signal line SCLn connected to the scan output terminal SCO may be maintained at the level of the gate-off voltage VGL during the turn-on period of the pull-down transistor VT.

Figure 8:
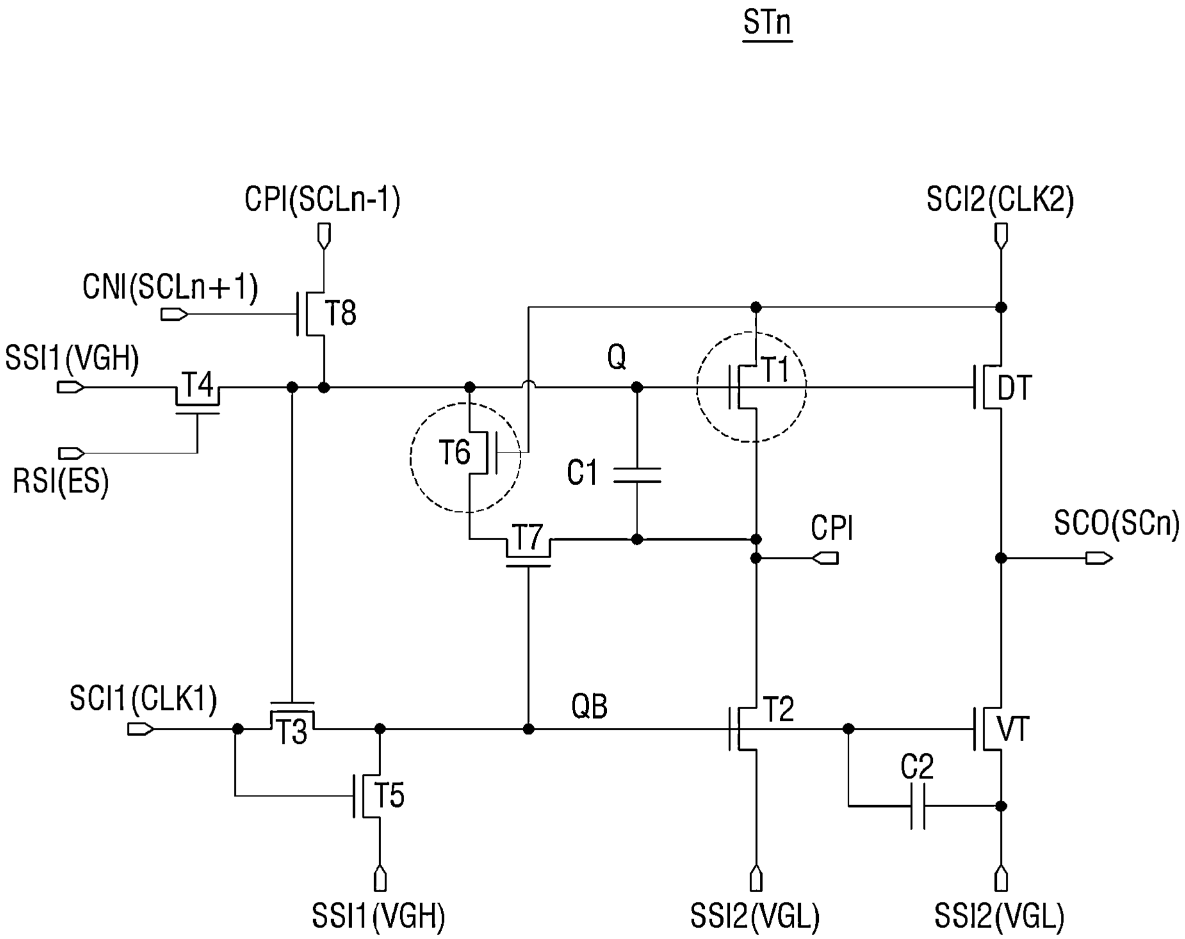
FIG. 8 is a schematic diagram of an equivalent circuit of a second embodiment of the $n^{th}$ stage of the scan driver illustrated in FIG. 5.

FIG. 8 is a schematic diagram of an equivalent circuit of a second embodiment of the $n^{th}$ stage of the scan driver illustrated in FIG. 5.

Referring to FIG. 8, an output node controller SCC of the $n^{th}$ stage STn may further include an eighth transistor T8 which disables a pull-up node Q with a gate-off voltage VGL in response to a next carry signal from a next stage STn+1.

A gate electrode of the eighth transistor T8 may be connected to a next carry terminal CNI, and a first electrode of the eighth transistor T8 may be connected to a previous carry terminal CPI or a second power supply terminal SSI2. For example, a second electrode of the eighth transistor T8 may be connected to the pull-up node Q. Accordingly, the eighth transistor T8 may supply the gate-off voltage VGL to the pull-up node Q in response to the next carry signal from the next stage STn+1.

As described above, the output node controllers SCC of all stages, e.g., the $(n-2)^{th}$ through $(n+2)^{th}$ stages STn−2 through STn+2 may each include the first through seventh transistors T1 through T7 or the first through eighth transistors T1 through T8. At least one of the first through eighth transistors T1 through T8 of the $n^{th}$ stage STn, for example, the first transistor T1, the third transistor T3, and the fourth transistor T4 may enable the pull-up node Q using the gate-on voltage VGH and, during a period in which the enabled pull-up node Q is bootstrapped to a voltage higher than the gate-on voltage VGH by one second scan clock signal CLK2, receive the bootstrapped voltage through any one electrode. Accordingly, the first, third, and fourth transistors T1, T3, and T4 may be subjected to high potential and high voltage stress, and the current and voltage characteristics such as threshold voltage characteristics of their semiconductor layers (or active layers) may be changed by the influence of the high potential and high voltage stress. In case that the current and voltage characteristics of the first, third, and fourth transistors T1, T3, and T4 are changed, the voltage and current output characteristics of the first, third, and fourth transistors T1, T3, and T4 may deteriorate, thereby reducing the output of each of the stages STn−2 through STn+2 or lowering reliability.

In this regard, the semiconductor layer (or active layer) of at least one of the first through eighth transistors T1 through T8 of the $n^{th}$ stage STn may be made of a different oxide semiconductor material from the semiconductor layer (or active layer) of at least one other transistor T1 through T8.

For example, the semiconductor layer (or active layer) of at least one transistor T1 through T8 which is connected (e.g., directly connected) to the pull-up node Q and subjected to high potential and high voltage stress among the first through eighth transistors T1 through T8 of the $n^{th}$ stage STn may include a different oxide semiconductor material from the semiconductor layer (or active layer) of at least one other transistor T1 through T8 which is not directly connected to the pull-up node Q.

For example, the semiconductor layers (or active layers) of the first, third, and fourth transistors T1, T3, and T4 connected (e.g., directly connected) to the pull-up node Q among the first through eighth transistors T1 through T8 of the $n^{th}$ stage STn may be made of a different oxide semiconductor material that expands the current range. Accordingly, the current amount (or carrier density) and current transfer speed (or electron mobility) of the first, third, and fourth transistors T1, T3, and T4 may be increased.

Figure 9:
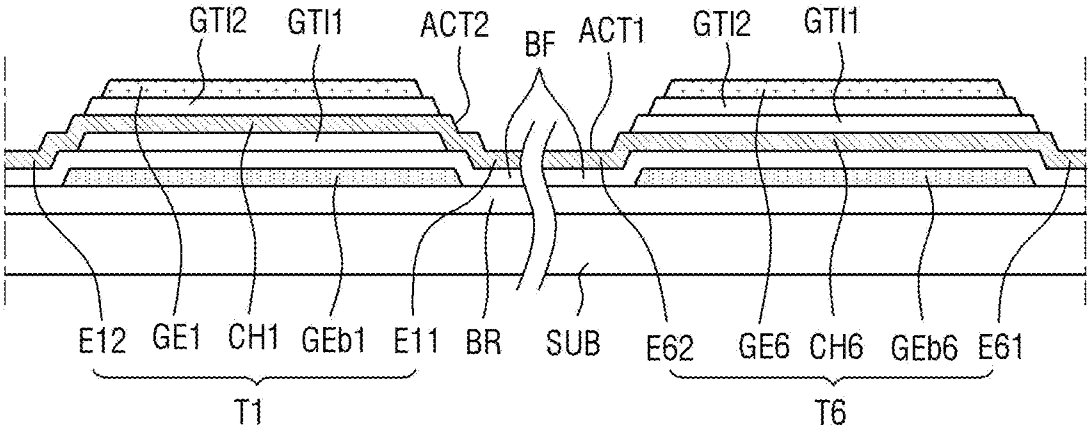
FIG. 9 is a schematic cross-sectional view illustrating the cross-sectional structure of first and sixth transistors of the scan driver illustrated in FIG. 8.

FIG. 9 is a schematic cross-sectional view illustrating the cross-sectional structure of first and sixth transistors T1 and T6 of the scan driver 610 illustrated in FIG. 8.

Referring to FIGS. 8 and 9, at least one transistor indirectly connected to the pull-up node Q, for example, the second, fifth, sixth, and seventh transistors T2, T5, T6 and T7 among transistors T1 through T8 included in $n^{th}$ stage STn may include a first active layer ACT1 including an oxide semiconductor (or first oxide semiconductor material).

For example, at least one transistor connected (e.g., directly connected) to the pull-up node Q, for example, the first, third, fourth and eighth transistors T1, T3, T4 and T8 among the transistors T1 through T8 included in the $n^{th}$ stage STn may include a second active layer ACT2 including an oxide semiconductor (or second oxide semiconductor material) different from the oxide semiconductor (or first oxide semiconductor material) of the first active layer ACT1.

For example, a barrier layer BR may be formed on the substrate SUB on which the $n^{th}$ stage STn is formed, and the thin-film transistor layer TFTL including transistors T1 through T8 of the $n^{th}$ stage STn may be formed on the barrier layer BR.

The substrate SUB may be a rigid substrate or a flexible substrate that is bendable, foldable, or rollable. The substrate SUB may be made of an insulating material such as glass, quartz, or polymer resin. The polymer material may be, for example, polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or a combination thereof. In another example, the substrate SUB may include a metal material.

The barrier layer BR may be disposed on the substrate SUB. The barrier layer BR may be a layer for protecting the thin-film transistor layer TFTL from moisture permeated through the substrate SUB which is vulnerable to moisture penetration. The barrier layer BR may be composed of inorganic layers stacked alternately. For example, the barrier layer BR may be a multilayer in which one or more inorganic layers selected from a silicon nitride layer, a silicon oxynitride layer, a silicon oxide layer, a titanium oxide layer, and an aluminum oxide layer are alternately stacked.

The thin-film transistor layer TFTL including transistors T1 through T8 of the $n^{th}$ stage STn may be formed on the barrier layer BR.

The thin-film transistor layer TFTL of at least one transistor indirectly connected to the pull-up node Q, for example, the thin-film transistor layer TFTL of the sixth transistor T6 may include a first gate electrode GEb6, an interlayer insulating layer BF, the first active layer ACT1, first and second gate insulating layers GTI1 and GTI2, and a second gate electrode GE6.

The interlayer insulating layer BF may be formed to cover the barrier layer BR as well as the first gate electrode GEb6.

The first active layer ACT1 may be formed to cover the first gate electrode GEb6 with the interlayer insulating layer BF interposed between the first active layer ACT1 and the first gate electrode GEb6, thereby forming a sixth channel region CH6. A first electrode E61 and a second electrode E62 may be defined (or formed) on a side and another side of the sixth channel region CH6 (or the first active layer ACT1), respectively.

The first gate insulating layer GTI1 may be formed to overlap the first gate electrode GEb6 with the first active layer ACT1 interposed between the first gate insulating layer GTI1 and the first gate electrode GEb6, and the second gate insulating layer GTI2 may be formed to overlap the first gate electrode GEb6 with the first gate insulating layer GTI1 interposed between the second gate insulating layer GTI2 and the first gate electrode GEb6.

The second gate electrode GE6 may be formed to overlap the first gate electrode GEb6 with the first and second gate insulating layers GTI1 and GTI2 interposed between the second gate electrode GE6 and the first gate electrode GEb6.

The interlayer insulating layer BF may include an inorganic layer, for example, a silicon nitride layer, a silicon oxynitride layer, a silicon oxide layer, a titanium oxide layer, or an aluminum oxide layer. The interlayer insulating layer BF may include inorganic layers.

The first active layer ACT1 may include polycrystalline silicon, monocrystalline silicon, low-temperature polycrystalline silicon, amorphous silicon, or an oxide semiconductor material. In case that the first active layer ACT1 includes an oxide semiconductor material, the first active layer ACT1 may include indium-gallium-zinc-oxide (IGZO).

In case that the first active layer ACT1 includes polycrystalline silicon or an oxide semiconductor material, a source region and a drain region in the first active layer ACT1 may be conductive regions doped with ions to have conductivity.

The first gate insulating layer GTI1 may include at least one of tetraethylorthosilicate (TEOS), silicon nitride ($SiN_x$), and silicon oxide ($SiO_2$). For example, the first gate insulating layer GTI1 may have a double-layer structure in which a silicon nitride layer having a thickness of about 40 nm and a tetraethylorthosilicate layer having a thickness of about 80 nm are sequentially stacked. The second gate insulating layer GTI2 may include the same material and structure as the first gate insulating layer GTI1 described above.

For example, at least one transistor connected (e.g., directly connected) to the pull-up node Q, for example, the first, third, fourth and eighth transistors T1, T3, T4 and T8 among the transistors T1 through T8 included in the $n^{th}$ stage STn may include the second active layer ACT2 including an oxide semiconductor different from the oxide semiconductor of the first active layer ACT1.

For example, the thin-film transistor layer TFTL of the first transistor T1 connected (e.g., directly connected) to the pull-up node Q may include a first gate electrode GEb1, the interlayer insulating layer BF, the second active layer ACT2, the first and second gate insulating layers GTI1 and GTI2, and a second gate electrode GE1.

The interlayer insulating layer BF may be formed to cover the barrier layer BR as well as the first gate electrode GEb1.

The second active layer ACT2 may be formed to cover the first gate electrode GEb1 with the interlayer insulating layer BF interposed between the second active layer ACT2 and the first gate electrode GEb1, thereby forming a first channel region CHI. A first electrode E11 and a second electrode E12 may be defined (or formed) on a side and another side of the first channel region CHI (or the second active layer ACT2), respectively.

The first gate insulating layer GTI1 may be formed to overlap the first gate electrode GEb1 with the second active layer ACT2 (or the interlayer insulating layer BF) interposed between the first gate insulating layer GTI1 and the first gate electrode GEb1, and the second gate insulating layer GTI2 may be formed to overlap the first gate electrode GEb1 with the first gate insulating layer GTI1 (or the second active layer ACT2) interposed between the second gate insulating layer GTI2 and the first gate electrode GEb1.

The second gate electrode GE6 may be formed to overlap the first gate electrode GEb6 with the first and second gate insulating layers GTI1 and GTI2 (or the second gate insulating layer GTI2 and the second active layer ACT2) interposed between the second gate electrode GE6 and the first gate electrode GEb6.

The second active layer ACT2 may include a different oxide semiconductor material from the first active layer ACT1. For example, in case that the first active layer ACT1 is an oxide semiconductor including indium-gallium-zinc-oxide (IGZO), the second active layer ACT2 may be an oxide semiconductor including indium-gallium-zinc-tin oxide (IGZTO). In case that the second active layer ACT2 includes a different oxide semiconductor material from the first active layer ACT1, a source region and a drain region in the second active layer ACT2 may be conductive regions doped with ions to have conductivity.

Since the first active layer ACT1 and the second active layer ACT2 are semiconductor layers made of different materials, the first active layer ACT1 and the second active layer ACT2 may be formed on the substrate SUB by different processes.

The second, fifth, sixth, and seventh transistors T2 and T5 through T7 which require high switching speed may include the first active layer ACT1 made of indium-gallium-zinc-oxide (IGZO).

However, the first, third, fourth and eighth transistors T1, T3, T4 and T8 which require a wide current amount transfer range and high reliability may include the second active layer ACT2 made of indium-gallium-zinc-tin oxide (IGZTO). For example, the first, third, fourth and eighth transistors T1, T3, T4 and T8 which are connected (e.g., directly connected) to the pull-up node Q and require high reliability may include a different oxide semiconductor material from the first, third, fourth and eighth transistors T1, T3, T4 and T8. Accordingly, high reliability and high speed may both be satisfied for the $n^{th}$ stage STn.

Figure 10:
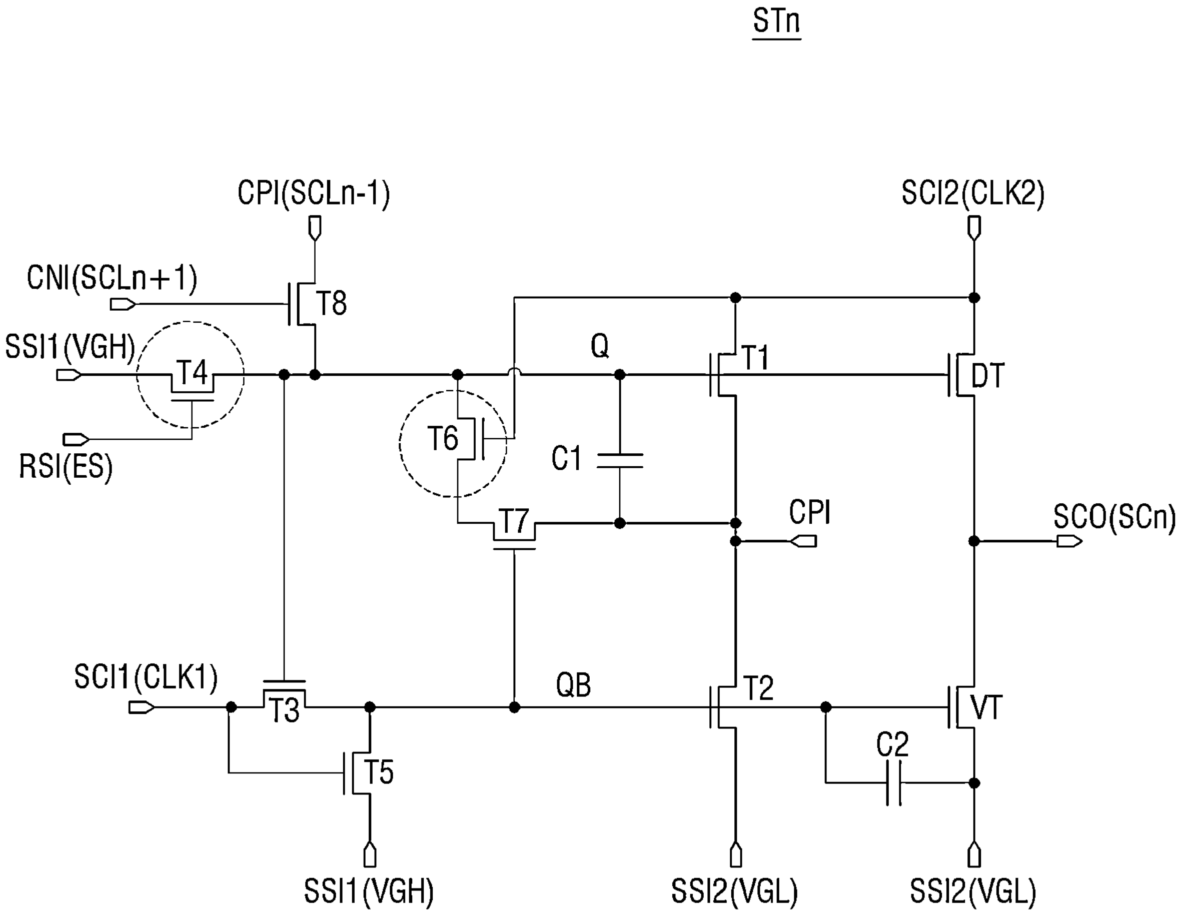
FIG. 10 is a schematic diagram of another embodiment of an $n^{th}$ stage of the scan driver illustrated in FIG. 8.

FIG. 10 is a schematic diagram of another embodiment of an $n^{th}$ stage of the scan driver 610 illustrated in FIG. 8. For example, FIG. 11 is a schematic cross-sectional view illustrating the cross-sectional structure of fourth and sixth transistors T4 and T6 of the scan driver 610 illustrated in FIG. 10.

Figure 11:
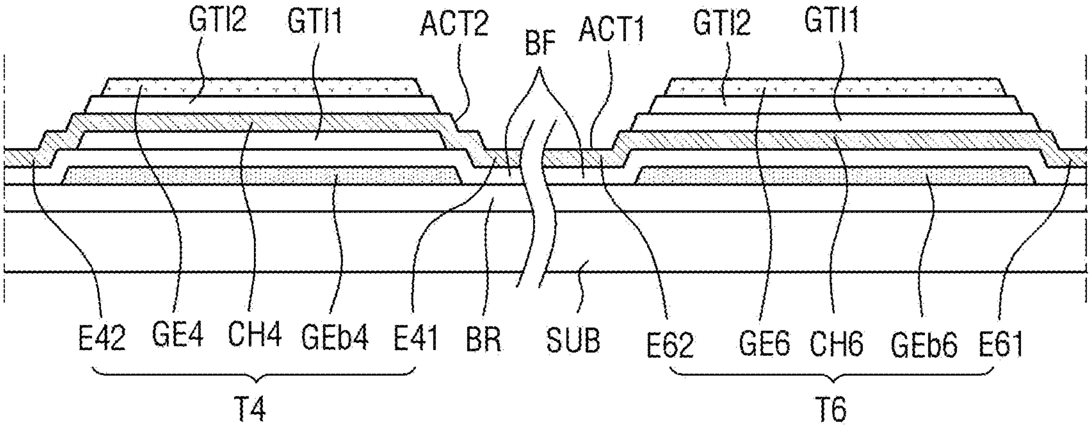
FIG. 11 is a schematic cross-sectional view illustrating the cross-sectional structure of fourth and sixth transistors of the scan driver illustrated in FIG. 10.

Referring to FIGS. 10 and 11, the fourth transistor T4 connected (e.g., directly connected) to the pull-up node Q, among the transistors T1 through T8 included in the $n^{th}$ stage STn may include a second active layer ACT2 including an oxide semiconductor different from the oxide semiconductor of the first active layer ACT1.

For example, the second, fifth, sixth, and seventh transistors T2, T5, T6 and T7 indirectly connected to the pull-up node Q among the transistors T1 through T8 included in the $n^{th}$ stage STn may include the first active layer ACT1 including an oxide semiconductor.

The thin-film transistor layer TFTL of the fourth transistor T4 connected (e.g., directly connected) to the pull-up node Q may include a first gate electrode GEb4, the interlayer insulating layer BF, the second active layer ACT2 forming a fourth channel region CH4, the first and second gate insulating layers GTI1 and GTI2, and a second gate electrode GE4.

The interlayer insulating layer BF may be formed to cover the barrier layer BR as well as the first gate electrode GEb4, and the second active layer ACT2 may be formed to cover the first gate electrode GEb4 with the interlayer insulating layer BF interposed between the second active layer ACT2 and the first gate electrode GEb4, thereby forming the fourth channel region CH4. A first electrode E41 and a second electrode E42 may be defined (or formed) on a side and another side of the fourth channel region CH4 (or the second active layer ACT2), respectively.

The first gate insulating layer GTI1 may be formed to overlap the first gate electrode GEb4 with the second active layer ACT2 interposed between the first gate insulating layer GTI1 and the first gate electrode GEb4, and the second gate insulating layer GTI2 may be formed to overlap the first gate electrode GEb4 with the first gate insulating layer GTI1 interposed between the second gate insulating layer GTI2 and the first gate electrode GEb4.

The second gate electrode GE6 may be formed to overlap the first gate electrode GEb6 with the first and second gate insulating layers GTI1 and GTI2 interposed between the second gate electrode GE6 and the first gate electrode GEb6, and the first electrode E61 and the second electrode E62 may be defined (or formed) on a side and another side of the sixth channel region CH6 (or the second active layer ACT2), respectively.

The second active layer ACT2 of the fourth transistor T4 may include an oxide semiconductor material different from the first active layer ACT1. The second active layer ACT2 may be an oxide semiconductor including indium-gallium-zinc-tin oxide (IGZTO).

Among the transistors T1 through T8 included in the $n^{th}$ stage STn, the third and fourth transistors T3 and T4 connected (e.g., directly connected) to the pull-up node Q may include the second active layer ACT2 including a different oxide semiconductor from the first active layer ACT1, and the first transistor T1 connected (e.g., directly connected) to the pull-up node Q may include the first active layer ACT1 including an oxide semiconductor.

In another example, among the transistors T1 through T8 included in the $n^{th}$ stage STn, the first transistor T1 connected (e.g., directly connected) to the pull-up node Q may include the second active layer ACT2 including a different oxide semiconductor from the first active layer ACT1, and the third and fourth transistors T3 and T4 connected (e.g., directly connected) to the pull-up node Q may include the first active layer ACT1 including an oxide semiconductor. The fifth transistor T5 may include the second active layer ACT2 including a different oxide semiconductor from the first active layer ACT1.

The pull-down transistor VT of the output controller OUC may include the first active layer ACT1 including an oxide semiconductor. For example, the pull-up transistor DT of the output controller OUC which is connected (e.g., directly connected) to the pull-up node Q may include the second active layer ACT2 including a different oxide semiconductor material from the first active layer ACT1 of the pull-down transistor VT.

Figure 12:
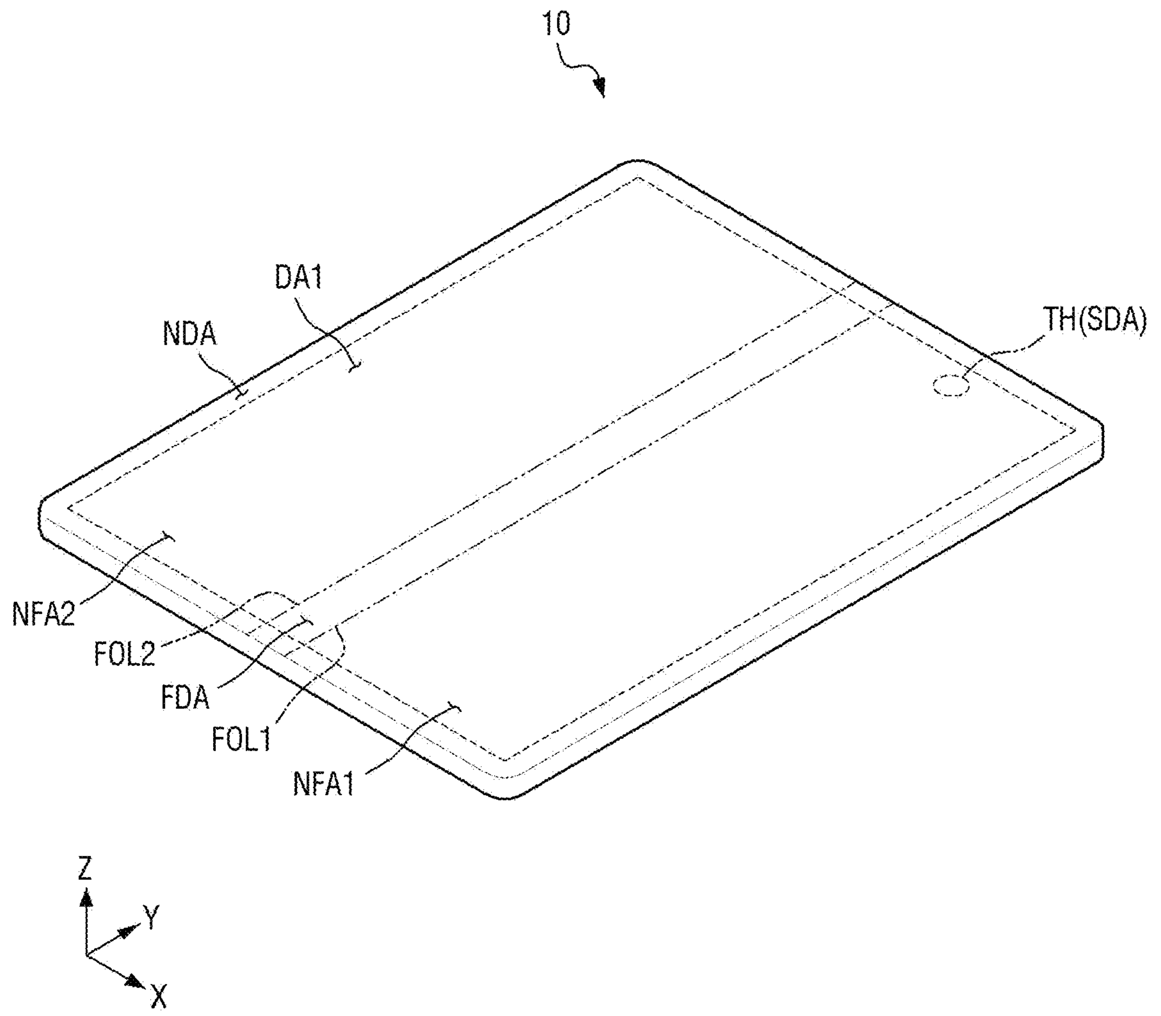
FIGS. 12 and 13 are schematic perspective views of an application example of a display device according to an embodiment.
Figure 13:
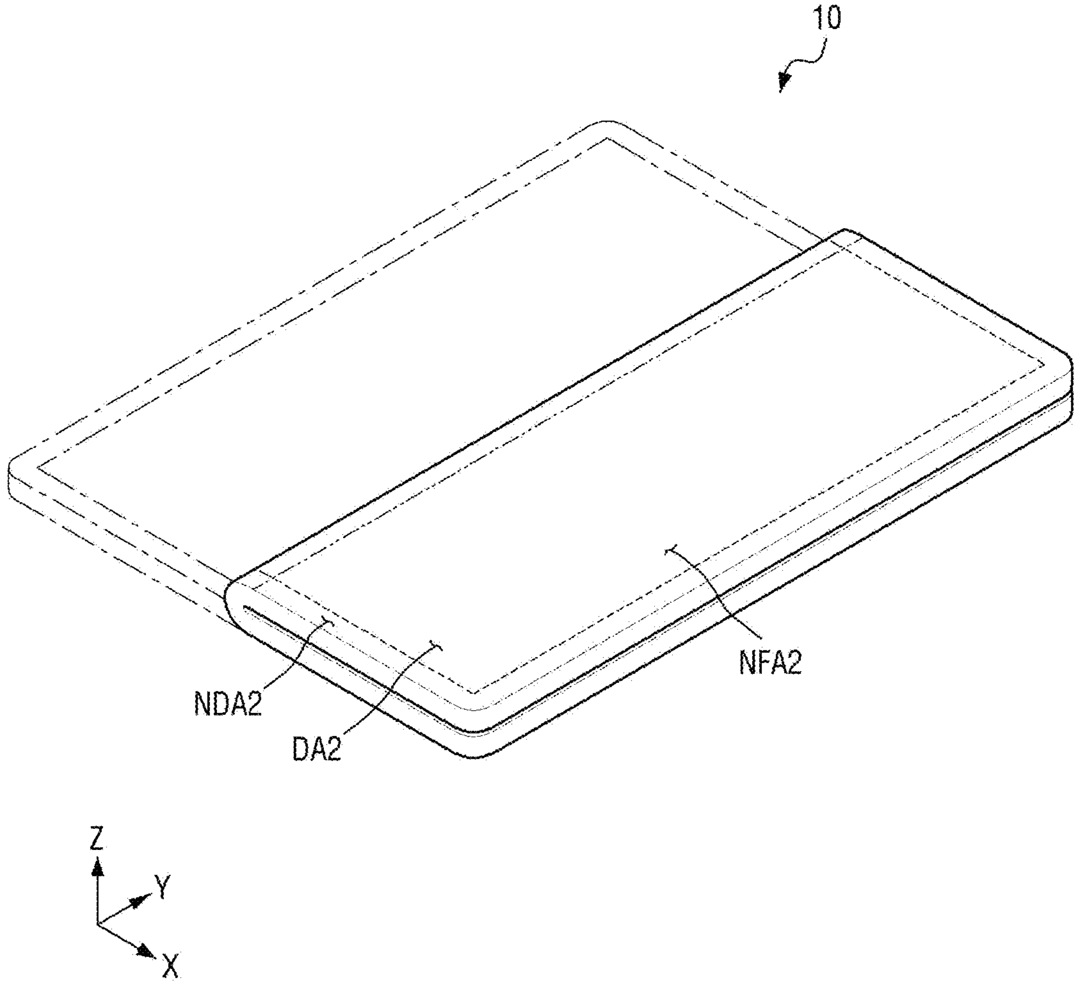

FIGS. 12 and 13 are schematic perspective views of an application example of a display device according to an embodiment.

FIGS. 12 and 13 illustrate an example in which the display device 10 is implemented as a foldable display device that is folded in a first direction (e.g., X-axis direction). The display device 10 may maintain both a folded state and an unfolded state. The display device 10 may be folded in an in-folding manner in which a front surface is disposed inside. In case that the display device 10 is bent or folded in the in-folding manner, portions of the front surface of the display device 10 may face each other. In another example, the display device 10 may be folded in an out-folding manner in which the front surface is disposed outside. In case that the display device 10 is bent or folded in the out-folding manner, portions of a back surface of the display device 10 may face each other.

A first non-folding area NFA1 may be disposed on a side, e.g., a right side of a folding area FDA. A second non-folding area NFA2 may be disposed on the other side, e.g., a left side of the folding area FDA. A touch sensing unit TSU according to an embodiment may be formed and disposed on each of the first non-folding area NFA1 and the second non-folding area NFA2.

A first folding line FOL1 and a second folding line FOL2 may extend in a second direction (e.g., Y-axis direction), and the display device 10 may be folded in the first direction (e.g., X-axis direction). Therefore, since a length of the display device 10 in the first direction (e.g., X-axis direction) is reduced by about half, a user may readily carry the display device 10.

The direction in which the first folding line FOL1 and the second folding line FOL2 extend is not limited to the second direction (e.g., Y-axis direction). For example, the first folding line FOL1 and the second folding line FOL2 may also extend in the first direction (e.g., X-axis direction), and the display device 10 may also be folded in the second direction (e.g., Y-axis direction). For example, a length of the display device 10 in the second direction (e.g., Y-axis direction) may be reduced by about half. In another example, the first folding line FOL1 and the second folding line FOL2 may extend in a diagonal direction of the display device 10 between the first direction (e.g., X-axis direction) and the second direction (e.g., Y-axis direction). For example, the display device 10 may be folded into a triangular shape.

In case that the first folding line FOL1 and the second folding line FOL2 extend in the second direction (e.g., Y-axis direction), a length of the folding area FDA in the first direction (e.g., X-axis direction) may be smaller than a length of the folding area FDA in the second direction (e.g., Y-axis direction). For example, a length of the first non-folding area NFA1 in the first direction (e.g., X-axis direction) may be greater than the length of the folding area FDA in the first direction (e.g., X-axis direction). A length of the second non-folding area NFA2 in the first direction (e.g., X-axis direction) may be greater than the length of the folding area FDA in the first direction (e.g., X-axis direction).

A first display area DA1 may be disposed on the front of the display device 10. The first display area DA1 may overlap the folding area FDA, the first non-folding area NFA1, and the second non-folding area NFA2. Therefore, in case that the display device 10 is unfolded, an image may be displayed toward the front in the folding area FDA, the first non-folding area NFA1, and the second non-folding area NFA2 of the display device 10 in the third direction (e.g., Z-axis direction).

A second display area DA2 may be disposed on the back of the display device 10. The second display area DA2 may overlap the second non-folding area NFA2. Therefore, in case that the display device 10 is folded, an image may be displayed toward the front in the second non-folding area NFA2 of the display device 10 in the third direction (e.g., Z-axis direction).

In FIGS. 12 and 13, a through hole TH in which a camera SDA is formed may be disposed in the first non-folding area NFA1. However, embodiments are not limited thereto. The through hole TH or the camera SDA may also be disposed in the second non-folding area NFA2 or the folding area FDA.

Figure 14:
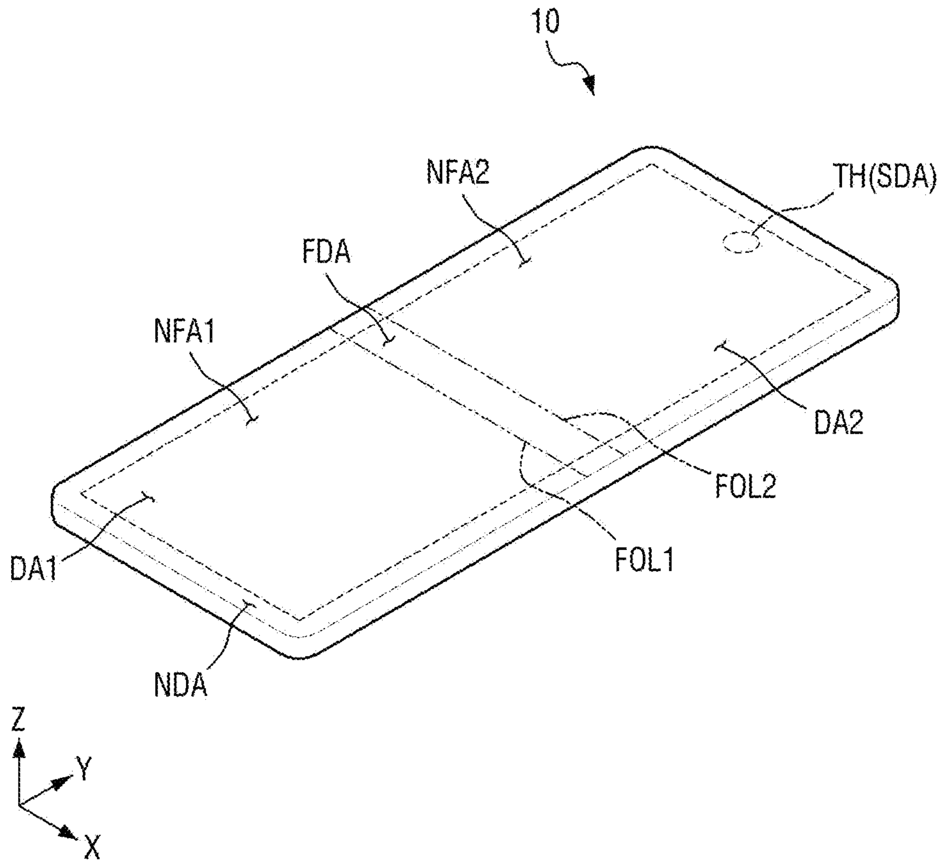
FIGS. 14 and 15 are schematic perspective views of an application example of a display device according to another embodiment.
Figure 15:
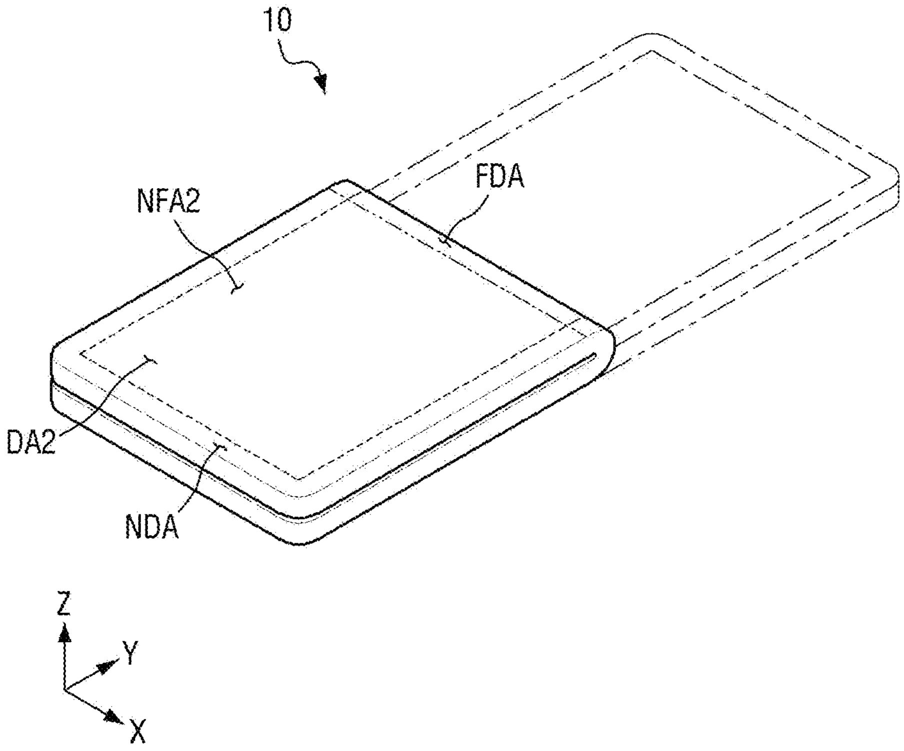

FIGS. 14 and 15 are schematic perspective views of an application example of a display device 10 according to another embodiment.

FIGS. 14 and 15 illustrate an example in which the display device 10 is implemented as a foldable display device that is folded in a second direction (e.g., Y-axis direction). The display device 10 may maintain both a folded state and an unfolded state. The display device 10 may be folded in an in-folding manner in which a front surface is disposed inside. In case that the display device 10 is bent or folded in the in-folding manner, portions of the front surface of the display device 10 may face each other. In another example, the display device 10 may be folded in an out-folding manner in which the front surface is disposed outside. In case that the display device 10 is bent or folded in the out-folding manner, portions of a back surface of the display device 10 may face each other.

The display device 10 may include a folding area FDA, a first non-folding area NFA1, and a second non-folding area NFA2. The folding area FDA may be an area where the display device 10 is folded, and the first non-folding area NFA1 and the second non-folding area NFA2 may be areas where the display device 10 is not folded. The first non-folding area NFA1 may be disposed on a side, e.g., a lower side of the folding area FDA. The second non-folding area NFA2 may be disposed on the other side, e.g., an upper side of the folding area FDA.

A touch sensing unit TSU according to an embodiment may be formed and disposed on each of the first non-folding area NFA1 and the second non-folding area NFA2.

The folding area FDA may be an area that is bent at a selected curvature at a first folding line FOL1 and a second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may extend in a first direction (e.g., X-axis direction) as illustrated in FIGS. 14 and 15, and the display device 10 may be folded in the second direction (e.g., Y-axis direction). Therefore, since a length of the display device 10 in the second direction (e.g., Y-axis direction) is reduced by about half, a user may readily carry the display device 10.

The direction in which the first folding line FOL1 and the second folding line FOL2 extend is not limited to the first direction (e.g., X-axis direction). For example, the first folding line FOL1 and the second folding line FOL2 may also extend in the second direction (e.g., Y-axis direction), and the display device 10 may also be folded in the first direction (e.g., X-axis direction). For example, a length of the display device 10 in the first direction (e.g., X-axis direction) may be reduced by about half. In another example, the first folding line FOL1 and the second folding line FOL2 may extend in a diagonal direction of the display device 10 between the first direction (e.g., X-axis direction) and the second direction (e.g., Y-axis direction). For example, the display device 10 may be folded into a triangular shape.

In case that the first folding line FOL1 and the second folding line FOL2 extend in the first direction (e.g., X-axis direction) as illustrated in FIGS. 14 and 15, a length of the folding area FDA in the second direction (e.g., Y-axis direction) may be smaller than a length of the folding area FDA in the first direction (e.g., X-axis direction). For example, a length of the first non-folding area NFA1 in the second direction (e.g., Y-axis direction) may be greater than the length of the folding area FDA in the second direction (e.g., Y-axis direction). A length of the second non-folding area NFA2 in the second direction (e.g., Y-axis direction) may be greater than the length of the folding area FDA in the second direction (e.g., Y-axis direction).

A first display area DA1 may be disposed on the front of the display device 10. The first display area DA1 may overlap the folding area FDA, the first non-folding area NFA1, and the second non-folding area NFA2. Therefore, in case that the display device 10 is unfolded, an image may be displayed toward the front in the folding area FDA, the first non-folding area NFA1, and the second non-folding area NFA2 of the display device 10 in the third direction (e.g., Z-axis direction).

A second display area DA2 may be disposed on the back of the display device 10. The second display area DA2 may overlap the second non-folding area NFA2. Therefore, in case that the display device 10 is folded, an image may be displayed toward the front in the second non-folding area NFA2 of the display device 10 in the third direction (e.g., Z-axis direction).

In FIGS. 14 and 15, a through hole TH in which a camera SDA is placed may be disposed in the second non-folding area NFA2. However, embodiments are not limited thereto. The through hole TH may also be disposed in the first non-folding area NFA1 or the folding area FDA.

In concluding the detailed description, those skilled in the art will appreciate that many variations and modifications may be made to the embodiments without substantially departing from the principles of the disclosure. Therefore, the disclosed embodiments of the disclosure are used in a generic and descriptive sense only and not for purposes of limitation.

What is claimed is:

1. A scan driver comprising:

stages which sequentially output scan signals to scan signal lines during an active period of an N-th frame, wherein N is a positive integer, wherein at least one of the stages comprises:

an output node controller that supplies a gate-on voltage to a pull-up node in response to a gate control signal of a display driver; and an output controller that supplies a scan signal to a scan signal line by outputting a scan clock signal, which is input through a scan clock terminal, to the scan signal line in case that the gate-on voltage is supplied to the pull-up node, and the output node controller comprises:

at least one thin-film transistor which includes a first active layer including a first oxide semiconductor material, and is directly or indirectly connected to the pull-up node; and at least another one thin-film transistor which includes a second active layer including a second oxide semiconductor material different from the first oxide semiconductor material of the first active layer, and is directly connected to the pull-up node.

2. The scan driver of claim 1, wherein the output node controller comprises:

a first transistor which is turned on in case that the pull-up node is enabled by the gate-on voltage and supplies the scan clock signal to a first capacitor, which is connected to the first transistor in parallel;

a second transistor which is turned on in case that a pull-down node is enabled by the gate-on voltage and supplies a gate-off voltage to the first transistor;

a third transistor which is turned on in case that the pull-up node is enabled by the gate-on voltage and supplies another scan clock signal to the pull-down node;

a fourth transistor which is turned on in response to a line selection signal of a sensing signal terminal or a previous carry signal and supplies the gate-on voltage to the pull-up node;

a fifth transistor which is turned on in response to the another scan clock signal and supplies the gate-on voltage to the pull-down node;

a sixth transistor which electrically connects the pull-up node to another transistor or the first capacitor in response to the scan clock signal; and a seventh transistor which is turned on in case that the pull-down node is enabled and electrically connects the sixth transistor to the first capacitor and the first transistor.

3. The scan driver of claim 2, wherein the output controller comprises:

a pull-up transistor which is turned on by the gate-on voltage of the pull-up node and outputs the scan clock signal to a scan output terminal and the scan signal line; and a pull-down transistor which is turned on by the gate-on voltage of the pull-down node and outputs the gate-off voltage to the scan output terminal and the scan signal line.

4. The scan driver of claim 3, wherein the pull-down transistor comprises the first active layer comprising the first oxide semiconductor material, and the pull-down transistor comprises the second active layer comprising the second oxide semiconductor material different from the first oxide semiconductor material.

5. The scan driver of claim 2, wherein the output node controller further comprises an eighth transistor which disables the pull-up node using the gate-off voltage or the scan clock signal in response to a next carry signal from a next stage.

6. The scan driver of claim 5, wherein at least one of the second, fifth, sixth, and seventh transistors indirectly connected to the pull-up node among the first through eighth transistors included in the output node controller comprises the first active layer comprising the first oxide semiconductor material, and at least one of the first, third, fourth, and eighth transistors directly connected to the pull-up node among the first through eighth transistors included in the output node controller comprises the second active layer comprising the second oxide semiconductor material different from the first oxide semiconductor material of the first active layer.

7. The scan driver of claim 2, wherein the first transistor has a gate electrode connected to the pull-up node, a first electrode connected to a second scan clock terminal and a second electrode connected to a previous carry terminal and a first electrode of the second transistor, the second transistor has a gate electrode connected to the pull-down node, the first electrode connected to the second electrode of the first transistor and the previous carry terminal and a second electrode connected to a gate-off voltage supply terminal, the third transistor has a gate electrode connected to the pull-up node, a first electrode connected to a first scan clock terminal and a second electrode connected to the pull-down node, the fourth transistor has a gate electrode connected to the sensing signal terminal or the previous carry terminal, a first electrode connected to a gate-on voltage supply terminal and a second electrode connected to the pull-up node, the fifth transistor has a gate electrode connected to the first scan clock terminal, the first electrode connected to the gate-on voltage supply terminal and a second electrode connected to the pull-down node, the sixth transistor has a gate electrode connected to the second scan clock terminal, a first electrode connected to the pull-up node and a second electrode connected to the second electrode of the first transistor or a first electrode of the seventh transistor, and the seventh transistor has a gate electrode connected to the pull-down node, the first electrode connected to the second electrode of the sixth transistor and a second electrode connected to the second electrode of the first transistor and the first capacitor.

8. The scan driver of claim 7, wherein the output controller comprises:

a pull-up transistor having a first electrode connected to the second scan clock terminal, a gate electrode connected to the pull-up node, and a second electrode connected to a scan output terminal; and a pull-down transistor having a first electrode connected to the scan output terminal, a gate electrode connected to the pull-down node, and a second electrode connected to a gate-off voltage supply terminal.

9. The scan driver of claim 8, wherein the pull-down transistor comprises the first active layer comprising the first oxide semiconductor material, and the pull-up transistor comprises the second active layer comprising the second oxide semiconductor material different from the first oxide semiconductor material of the first active layer.

10. The scan driver of claim 7, wherein the output node controller further comprises an eighth transistor including:

a gate electrode connected to a next carry terminal, a first electrode connected to the previous carry terminal or the gate-off voltage supply terminal, and a second electrode connected to the pull-up node.

11. The scan driver of claim 10, wherein at least one of the second, fifth, sixth, and seventh transistors indirectly connected to the pull-up node among the first through eighth transistors included in the output node controller comprises the first active layer comprising the first oxide semiconductor material, and at least one of the first, third, fourth, and eighth transistors directly connected to the pull-up node among the first through eighth transistors included in the output node controller comprises the second active layer comprising the second oxide semiconductor material different from the first oxide semiconductor material of the first active layer.

12. The scan driver of claim 7, wherein the first active layer comprises indium-gallium-zinc-oxide, and the second active layer comprises indium-gallium-zinc-tin oxide.

13. A display device comprising:

a plurality of pixels arranged in a display area of a display panel;

a touch sensing unit disposed on a front of the display panel and integral with the display panel;

a touch driver that senses a touch using a plurality of touch electrodes arranged in the touch sensing unit;

a display driver that controls data voltages supplied to the plurality of pixels and image display timing of the plurality of pixels; and a scan driver that sequentially drives scan signal lines, which are connected to the plurality of pixels, in response to a gate control signal received from the display driver, wherein the scan driver comprises stages which sequentially output scan signals to the scan signal lines during an active period of an N-th frame, wherein N is a positive integer, at least one of the stages comprises:

an output node controller that supplies a gate-on voltage to a pull-up node in response to a gate control signal of a display driver; and an output controller that outputs a scan signal to a scan signal line by outputting a scan clock signal, which is input through a scan clock terminal, to the scan signal line in case that the gate-on voltage is supplied to the pull-up node, and the output node controller comprises:

at least one thin-film transistor comprising a first active layer including a first oxide semiconductor material, and is indirectly connected to the pull-up node; and at least another one thin-film transistor comprising a second active layer comprising a second oxide semiconductor material different from the first oxide semiconductor material of the first active layer, and is indirectly connected to the pull-up node.

14. The display device of claim 13, wherein the output node controller comprises:

a first transistor which is turned on in case that the pull-up node is enabled by the gate-on voltage and supplies the scan clock signal to a first capacitor, which is connected to the first transistor in parallel;

a second transistor which is turned on in case that a pull-down node is enabled by the gate-on voltage and supplies a gate-off voltage to the first transistor;

a third transistor which is turned on in case that the pull-up node is enabled by the gate-on voltage and supplies another scan clock signal to the pull-down node;

a fourth transistor which is turned on in response to a line selection signal of a sensing signal terminal or a previous carry signal and supplies the gate-on voltage to the pull-up node;

a fifth transistor which is turned on in response to the another scan clock signal and supplies the gate-on voltage to the pull-down node;

a sixth transistor which electrically connects the pull-up node to another transistor or the first capacitor in response to the scan clock signal; and a seventh transistor which is turned on in case that the pull-down node is enabled and electrically connects the sixth transistor to the first capacitor and the first transistor.

15. The display device of claim 14, wherein the output controller comprises:

a pull-up transistor which is turned on by the gate-on voltage of the pull-up node and outputs the scan clock signal to a scan output terminal and the scan signal line; and a pull-down transistor which is turned on by the gate-on voltage of the pull-down node and outputs the gate-off voltage to the scan output terminal and the scan signal line.

16. The display device of claim 14, wherein the output node controller further comprises an eighth transistor which disables the pull-up node using the gate-off voltage or the scan clock signal in response to a next carry signal from a next stage.

17. The display device of claim 14, wherein the first transistor has a gate electrode connected to the pull-up node, a first electrode connected to a second scan clock terminal and a second electrode connected to a previous carry terminal and a first electrode of the second transistor, the second transistor has a gate electrode connected to the pull-down node, the first electrode connected to the second electrode of the first transistor and the previous carry terminal and a second electrode connected to a gate-off voltage supply terminal, the third transistor has a gate electrode connected to the pull-up node, a first electrode connected to a first scan clock terminal and a second electrode connected to the pull-down node, the fourth transistor has a gate electrode connected to the sensing signal terminal or the previous carry terminal, a first electrode connected to a gate-on voltage supply terminal and a second electrode connected to the pull-up node, the fifth transistor has a gate electrode connected to the first scan clock terminal, the first electrode connected to the gate-on voltage supply terminal and a second electrode connected to the pull-down node, the sixth transistor has a gate electrode connected to the second scan clock terminal, a first electrode connected to the pull-up node and a second electrode connected to the second electrode of the first transistor or a first electrode of the seventh transistor, and the seventh transistor has a gate electrode connected to the pull-down node, the first electrode connected to the second electrode of the sixth transistor and a second electrode connected to the second electrode of the first transistor and the first capacitor.

18. The display device of claim 17, wherein the output controller comprises:

a pull-up transistor having a first electrode connected to the second scan clock terminal, a gate electrode connected to the pull-up node, and a second electrode connected to a scan output terminal; and a pull-down transistor having a first electrode connected to the scan output terminal, a gate electrode connected to the pull-down node, and a second electrode connected to a gate-off voltage supply terminal.

19. The display device of claim 17, wherein the output node controller further comprises an eighth transistor including:

a gate electrode connected to a next carry terminal, a first electrode connected to the previous carry terminal or the gate-off voltage supply terminal, and a second electrode connected to the pull-up node.

20. The display device of claim 19, wherein at least one of the second, fifth, sixth, and seventh transistors indirectly connected to the pull-up node among the first through eighth transistors included in the output node controller comprises the first active layer comprising a first oxide semiconductor material, and at least one of the first, third, fourth, and eighth transistors directly connected to the pull-up node among the first through eighth transistors included in the output node controller comprises the second active layer comprising a second oxide semiconductor material different from the first oxide semiconductor material of the first active layer.

* * * * *